(12) United States Patent
Borrelli et al.

(10) Patent No.: US 12,147,072 B2
(45) Date of Patent: Nov. 19, 2024

(54) OPTICAL TRANSFORMING ARTICLE

(71) Applicant: CORNING INCORPORATED, Corning, NY (US)

(72) Inventors: Nicholas Francis Borrelli, Elmira, NY (US); Ming-Jun Li, Horseheads, NY (US); Xiao Li, Santa Clara, CA (US); David John McEnroe, Wellsville, NY (US); Robert Adam Modavis, Painted Post, NY (US); Daniel Aloysius Nolan, Corning, NY (US); Alranzo Boh Ruffin, Painted Post, NY (US); Vitor Marino Schneider, Painted Post, NY (US); Thomas Philip Seward, III, Elmira, NY (US); Alexander Mikhailovich Streltsov, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 217 days.

(21) Appl. No.: 17/834,124

(22) Filed: Jun. 7, 2022

(65) Prior Publication Data
US 2022/0397719 A1  Dec. 15, 2022

Related U.S. Application Data

(60) Provisional application No. 63/209,597, filed on Jun. 11, 2021.

(51) Int. Cl.
*G02B 6/04* (2006.01)
*C03B 23/023* (2006.01)
(Continued)

(52) U.S. Cl.
CPC .............. *G02B 6/04* (2013.01); *C03B 23/023* (2013.01); *C03B 33/04* (2013.01); *C03C 19/00* (2013.01); *C03C 23/0025* (2013.01)

(58) Field of Classification Search
CPC ......... G02B 6/04; C03B 23/023; C03B 33/04; C03C 19/00
See application file for complete search history.

(56) References Cited

U.S. PATENT DOCUMENTS

| 3,870,399 A | 3/1975 | Randall et al. |
| 5,299,275 A | 3/1994 | Jackson et al. |

(Continued)

FOREIGN PATENT DOCUMENTS

| CN | 103412424 A | 11/2013 |
| CN | 111025461 A | 4/2020 |

(Continued)

OTHER PUBLICATIONS

Invitation to pay Additional fee issued in PCT/US2022/032767; dated Sep. 15, 2022; 12 pages; European Patent Office.
(Continued)

*Primary Examiner* — Sung H Pak

(57) ABSTRACT

An article includes an optical transforming layer and a guide region positioned inside and adjacent to at least a portion of a perimeter of the optical transforming layer. The guide region comprises an inlet end positioned adjacent to a first surface of the optical transforming layer and an outlet end positioned adjacent a second surface of the optical transforming layer. The guide region propagates light from the inlet end to the outlet end such that the light is directed from the first surface to the second surface. The guide region includes a phase-separated glass comprising a continuous network phase and a discontinuous phase. A relative difference in index of refraction between the continuous network phase and the discontinuous phase is greater than or equal to (Continued)

0.3%. The discontinuous phase comprises elongated shaped regions aligned along a common axis and having an aspect ratio greater than or equal to 10:1.

20 Claims, 15 Drawing Sheets

(51) Int. Cl.
*C03B 33/04* (2006.01)
*C03C 19/00* (2006.01)
*C03C 23/00* (2006.01)

(56) References Cited

U.S. PATENT DOCUMENTS

| | | |
|---|---|---|
| 6,640,039 B1 | 10/2003 | Miura et al. |
| 6,892,014 B2 | 5/2005 | Cok et al. |
| 2012/0014129 A1 | 1/2012 | Chiang et al. |
| 2013/0278872 A1 | 10/2013 | Teller et al. |
| 2015/0093086 A1* | 4/2015 | Wu .................... G02F 1/133524 385/132 |
| 2019/0391326 A1 | 12/2019 | Yang et al. |
| 2020/0133614 A1* | 4/2020 | Oh ........................ G06F 3/1446 |

FOREIGN PATENT DOCUMENTS

| | | |
|---|---|---|
| EP | 1116965 A1 | 7/2001 |
| WO | 2015/027718 A1 | 3/2015 |
| WO | 2020/197777 A1 | 10/2020 |

OTHER PUBLICATIONS

Lee et al., "Development of Zero-bezel Display Utilizing a Waveguide Image Transformation Element", SID 2017 Digest, vol. 43-2, 2017, pp. 612-614.

Miller, "Light propagation in generalized lens-like media", The Bell System Technical Journal, Nov. 1965, pp. 2017-2063.

* cited by examiner

OPTICAL TRANSFORMING ARTICLE

This application claims the benefit of priority under 35 U.S.C. § 119 of U.S. Provisional Application Ser. No. 63/209,597 filed on Jun. 11, 2021 the content of which is relied upon and incorporated herein by reference in its entirety.

BACKGROUND

Field

The present specification relates to displays for electronic devices. More specifically, the present specification is directed to an optical transforming article that hides a bezel of an electronic device.

Technical Background

Electronic devices such as phones, tablets, and other portable devices are often provided with displays. In a typical configuration, a rectangular array of display pixels is located in a central active region of the display. An inactive border region (i.e., "bezel") surrounds the central active region. Components such as driver circuits may be formed in the inactive border region. The inactive border region must generally contain sufficient space for these components because these components are used in controlling the operation of the display. Nevertheless, excessively large inactive border regions may make a device overly large and may detract from device aesthetics.

Accordingly, a need exists for ways to hide the bezel of the display while expanding the viewing angle of the display.

SUMMARY

According to a first aspect A1, an article may comprise: an optical transforming layer having a first surface and a second surface opposite the first surface, the first surface and the second surface bound by a perimeter of the optical transforming layer; and a guide region positioned inside and adjacent to at least a portion of the perimeter of the optical transforming layer, wherein the guide region extends at least partially between the first surface to the second surface, wherein the guide region comprises an inlet end positioned adjacent to the first surface and an outlet end positioned adjacent the second surface, wherein the guide region propagates light from the inlet end to the outlet end such that the light is directed from the first surface to the second surface, the guide region comprising: phase-separated glass comprising a continuous network phase and a discontinuous phase, wherein a relative difference in index of refraction between the continuous network phase and the discontinuous phase is greater than or equal to 0.3%, wherein the discontinuous phase comprises elongated shaped regions aligned along a common axis and having an aspect ratio greater than or equal to 100:1.

A second aspect A2 includes the article according to the first aspect A1, wherein the index of refraction of the discontinuous phase is greater than the index of refraction of the continuous network phase such that light is propagated within the discontinuous phase from the inlet end to the outlet end.

A third aspect A3 includes the article according to the first aspect A1, wherein the index of refraction of the discontinuous phase is lower than index of refraction of the continuous network phase such that light is propagated within the continuous network phase from the inlet end to the outlet end.

A fourth aspect A4 includes the article according to any of the first through third aspects A1-A3, wherein the discontinuous phase comprises elongated shaped regions of various lengths.

A fifth aspect A5 includes the article according to any of the first through fourth aspects A1-A4, wherein the discontinuous phase is randomly arranged within the continuous network phase.

A sixth aspect A6 includes the article according to any of the first through fifth aspects A1-A5, wherein the discontinuous phase comprises a glass-based material.

A seventh aspect A7 includes the article according to the sixth aspect A6, wherein the discontinuous phase comprises a modified portion of the continuous network phase.

An eighth aspect A8 includes the article according to any of the first through fifth aspects A1-A5, wherein the discontinuous phase comprises air.

A ninth aspect A9 includes the article according to any of the first through eighth aspects A1-A8, wherein the optical transforming layer is entirely comprised of the guide region.

A tenth aspect A10 includes the article according to any of the first through eighth aspects A1-A8, wherein the article further includes a guide-free region, wherein the guide-free region is distinct from the guide region.

An eleventh aspect A11 includes the article according to the tenth aspect A10, wherein the optical transforming layer is disposed adjacent to and bounded by the guide region.

A twelfth aspect A12 includes the article according to any of the first through eleventh aspects A1-A11, wherein the guide region comprises a plurality of optical pathways that extend through the guide region, wherein each optical pathway has an inlet end and an outlet end.

A thirteenth aspect A13 includes the article according to the twelfth aspect A12, wherein the plurality of optical pathways comprises a straight pathway, wherein the inlet end and the outlet end of the straight pathway are offset from a center of the optical transforming layer by a same distance.

A fourteenth aspect A14 includes the article according to the twelfth aspect A12 or thirteenth aspect A13, wherein the plurality of optical pathways comprises a shaped pathway, wherein the inlet end of the shaped pathway is closer to a center of the optical transforming layer than the outlet end of the shaped pathway.

A fifteenth aspect A15 includes the article according to the fourteenth aspect A14, wherein a central optical axis of the shaped pathway is generally linear from the inlet end to the outlet end.

A sixteenth aspect A16 includes the article according to the fifteenth aspect A15, wherein the shaped pathway tapers from the second surface to the first surface.

A seventeenth aspect A17 includes the article according to the fourteenth aspect A14, wherein a central optical axis of the shaped pathway comprises a radius of curvature from the inlet end to the outlet end.

An eighteenth aspect A18 includes the article according to the twelfth aspect A12, wherein the plurality of optical pathways comprises: a plurality of straight pathways, the inlet end and the outlet end of each of the straight pathways being offset from a center of the optical transforming layer by a same distance; and a plurality of shaped pathways, the inlet end of each of the shaped pathways being closer to the center of the optical transforming layer than the outlet end of each of the shaped pathways, wherein the plurality of straight pathways are positioned between the center of the optical transforming layer and the plurality of shaped pathways.

A nineteenth aspect A19 includes the article according to of the eighteenth aspect A18, wherein a central optical axis of each of the plurality of shaped pathways is generally linear from the inlet end to the outlet end.

A twentieth aspect A20 includes the article according to the nineteenth aspect A19, wherein the plurality of shaped pathways taper from the second surface to the first surface.

A twenty-first aspect A21 includes the article according to the eighteenth aspect A18, wherein a central optical axis of each of the plurality of shaped pathways comprises a radius of curvature from the inlet end to the outlet end.

A twenty-second aspect A22 includes the article according to any of the first through twenty-first aspects A1-A21, wherein the article is the optical transforming layer.

A twenty-third aspect A23 includes the article according to any of the first through twenty-first aspects A1-A21, wherein the article is a display device.

A twenty-fourth aspect A24 includes the article according to the twenty-third aspect A23, wherein the display device further comprises: a display area; and a bezel extending around the display area, wherein the optical transforming layer is arranged adjacent to an outer surface of the display area.

A twenty-fifth aspect A25 includes the article according to the twenty-fourth aspect A24, wherein an area of the guide region is greater than an area of the bezel.

A twenty-sixth aspect A26 includes the article according to the twenty-fourth aspect A24, wherein an area of the guide region is less than or equal to an area of the bezel.

A twenty-seventh aspect A27 includes the article according to any of the first through twenty-sixth aspects A1-A26, wherein an the optical transforming layer is planar.

A twenty-eighth aspect A28 includes the article according to any any of the first through twenty-seventh aspects A1-A27, wherein an edge portion of the optical transforming layer comprises a concave portion adjacent to the perimeter.

A twenty-ninth aspect A29 includes the article according to any of the first through twenty-eighth aspects A1-A28, wherein an edge portion of the optical transforming layer comprises a conves portion adjacent to the perimeter.

According to a thirtieth aspect A30, a method of forming an optical transforming article may comprise: providing an optical article comprising: a first surface; a second surface opposite the first surface, the first surface and second surface bound by a perimeter of the optical article; a guide region positioned adjacent to at least a portion of the perimeter of the optical article wherein the guide region extends at least partially between the first surface to the second surface, wherein the guide region comprises an inlet end position adjacent to the first surface and an outlet end position adjacent the second surface, wherein the guide region propagates light from the inlet end to the outlet end such that the light is directed from the first surface to the second surface, the guide region comprising: a phase-separated glass comprising a continuous network phase and a discontinuous phase wherein a relative difference in index of refraction between the continuous network phase and the discontinuous phase is greater than or equal to 0.3%, wherein the discontinuous phase comprises elongated shaped regions aligned along a common axis and having an aspect ratio greater than or equal to 100:1; and bending the optical article adjacent to the perimeter at a radius of curvature in the range from 50 µm to 5000 µm such that a portion of the guide region located near the perimeter is shaped, the inlet end of the shaped portion of the guide region being closer to a center of the optical transforming layer than the outlet end of the shaped portion of the guide region; cropping the optical article along a point of the bended optical article; and polishing the optical article to obtain the optical transforming article having a generally uniform thickness.

A thirty-first aspect A31 includes the article according to the thirtieth aspect A30, wherein the bending step includes bending the optical article at a point positioned in a range from 0.1 mm to 10 mm from the perimeter of the optical article.

A thirty-second aspect A32 includes the article according to the thirtieth aspect A30 or thirty-first aspect A31, wherein the optical article has a thickness in the range from 0.1 mm to 5 mm.

A thirty-third aspect A33 includes the article according to any of the thirtieth through thirty-second aspects A30-A32, wherein the optical article is a rod having a diameter in the range from 1 cm to 10 cm.

A thirty-fourth aspect A34 includes the article according to any of the thirty-first through thirty-third aspects A31-A33, wherein after the polishing step, the bending, cropping, and polishing steps are repeated such that the shaped portion of the guide region becomes curved.

According to a thirty-fifth aspect A35, a method of forming a tapered guide region in an article may comprise: providing a substrate; forming a groove at an edge portion of the substrate; filling the groove with a guide material, the guide material having an index of refraction greater than that of the substrate; bending the edge portion of the substrate at a radius of curvature in the range of 50 µm to 5000 µm such that the edge portion of the substrate and the guide material located therein become curved; cropping the substrate along a point of the curved edge of the substrate; and polishing the substrate to form the article having generally uniform thickness and the tapered guide region.

According to a thirty-sixth aspect A36, a method of forming a guide region in an article may comprise: providing a substrate; and directing an ultrashort pulsed laser at the substrate to simultaneously modify multiple points of the material and generate a guide region, wherein an ultrashort pulsed laser beam of the ultrashort pulsed laser has: a wavelength in a range from 200 nm to 10000 nm; a pulse shape in a range from 1 fs to 10000 fs; and an average spot diameter in a range from 1 µm to 1000 µm.

Additional features and advantages of the optical transforming article described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
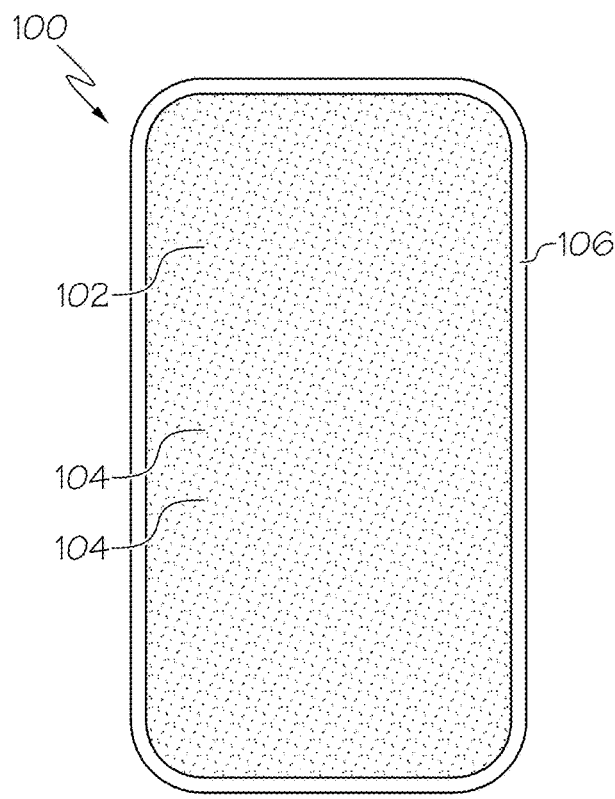
FIG. 1 is a top down view of an electronic device.

Reference will now be made in detail to various embodiments of an optical transforming article that hides a bezel of an electronic device. According to embodiments, an article includes an optical transforming layer and a guide region positioned inside and adjacent to at least a portion of a perimeter of the optical transforming layer. The guide region extends at least partially between a first surface of the optical transforming layer to a second surface of the optical transforming layer. The guide region comprises an inlet end positioned adjacent to the first surface and an outlet end positioned adjacent the second surface. The guide region propagates light from the inlet end to the outlet end such that the light is directed from the first surface to the second surface. The guide region includes a phase-separated glass comprising a continuous network phase and a discontinuous phase. A relative difference in index of refraction between the continuous network phase and the discontinuous phase is greater than or equal to 0.3%. The discontinuous phase comprises elongated shaped regions aligned along a common axis and having an aspect ratio greater than or equal to 10:1. In embodiments, a method of forming an optical transforming article includes providing an optical article, bending the optical article adjacent to the perimeter at a radius of curvature in the range of from 50 μm to 5000 μm such that a portion of the guide region located near the perimeter is shaped, the inlet end of the shaped portion of the guide region being closer to a center of the optical transforming article than the outlet end of the shaped portion of the guide region; cropping the optical article along a point of the bended optical article; and polishing the optical article to obtain the optical transforming article having a generally uniform thickness. In embodiments, a method of forming a tapered guide region in an article includes: providing a substrate; forming a groove at an edge portion of the substrate; filling the groove with a guide material, the guide material having an index of refraction greater than that of the substrate; bending the edge portion of the substrate at a radius of curvature in the range of 50 μm to 5000 μm such that the edge portion of the substrate and the guide material located therein become curved; cropping the substrate along a point of the curved edge of the substrate; and polishing the substrate to form the article having generally uniform thickness and the tapered guide region. In embodiments, a method of forming a guide region in an article includes: providing a substrate; and directing an ultrashort pulsed laser at the substrate to simultaneously modify multiple points of the material and generate a guide region. An ultrashort pulsed laser beam of the ultrashort pulsed laser has a wavelength in a range from 200 nm to 10000 nm, a pulse width in a range from 1 fs to 10000 fs, and an average spot diameter in a range from 1 μm to 1000 μm. Various embodiments of optical transforming articles and methods of making optical transforming articles will be referred to herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, a display device 100 includes a display area 102 having a rectangular array of display pixels 104. An inactive border region (i.e., "bezel") 106 extends around the display area 102. While the bezel 106 helps to conceal components, such as driver circuits, the bezel 106 may detract from the aesthetics of the display device 100.

Conventional methods to hide the bezel 106 may include an array of optical fibers aligned with the array of display pixels 104 that taper where the bezel 106 is present such that light is guided around the bezel 106. However, conventional fiber arrays are made by periodically stacking hundreds or even thousands of small fibers and fusing them together to cover the entire display area 102, which may lead to increased manufacturing costs. Moreover, the discrete nature of conventional fiber arrays may result in pixelated images with reduced image contrast and blurring.

Figure 2:
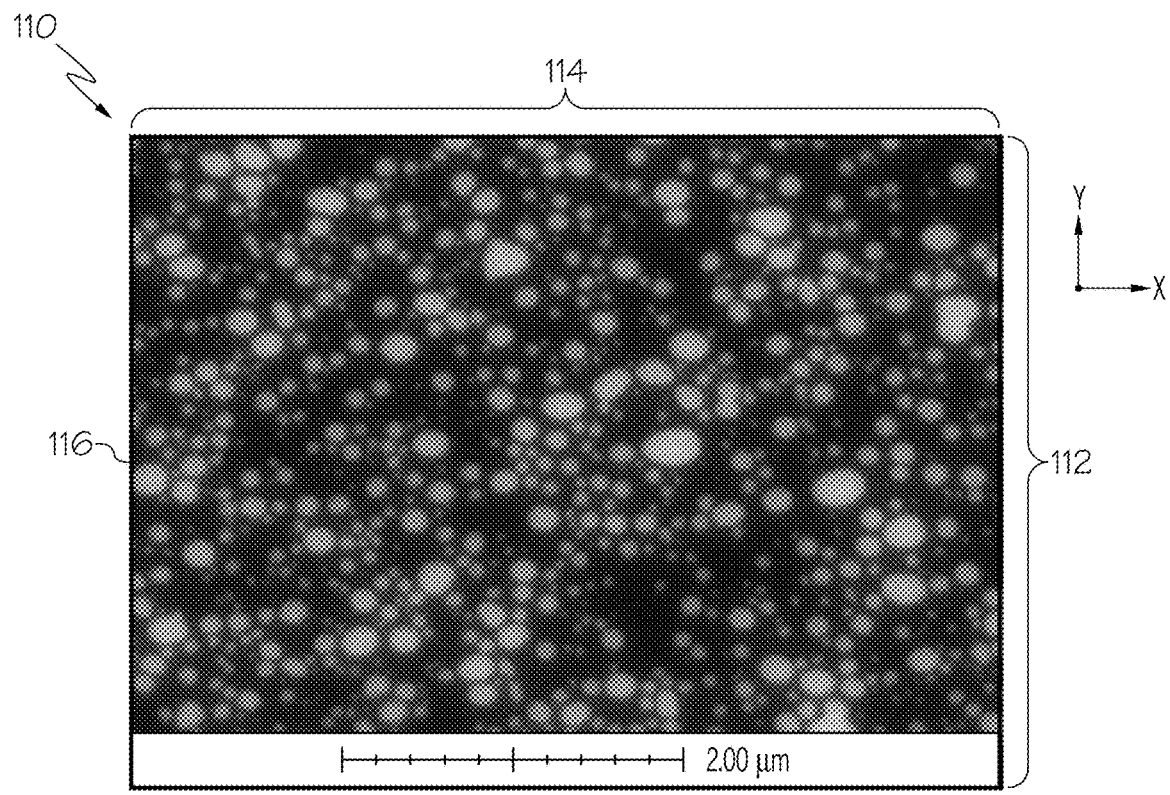
FIG. 2 is a scanning electron microscope (SEM) image of an optical transforming article along an x-y plane according to one or more embodiments described herein.
Figure 3:
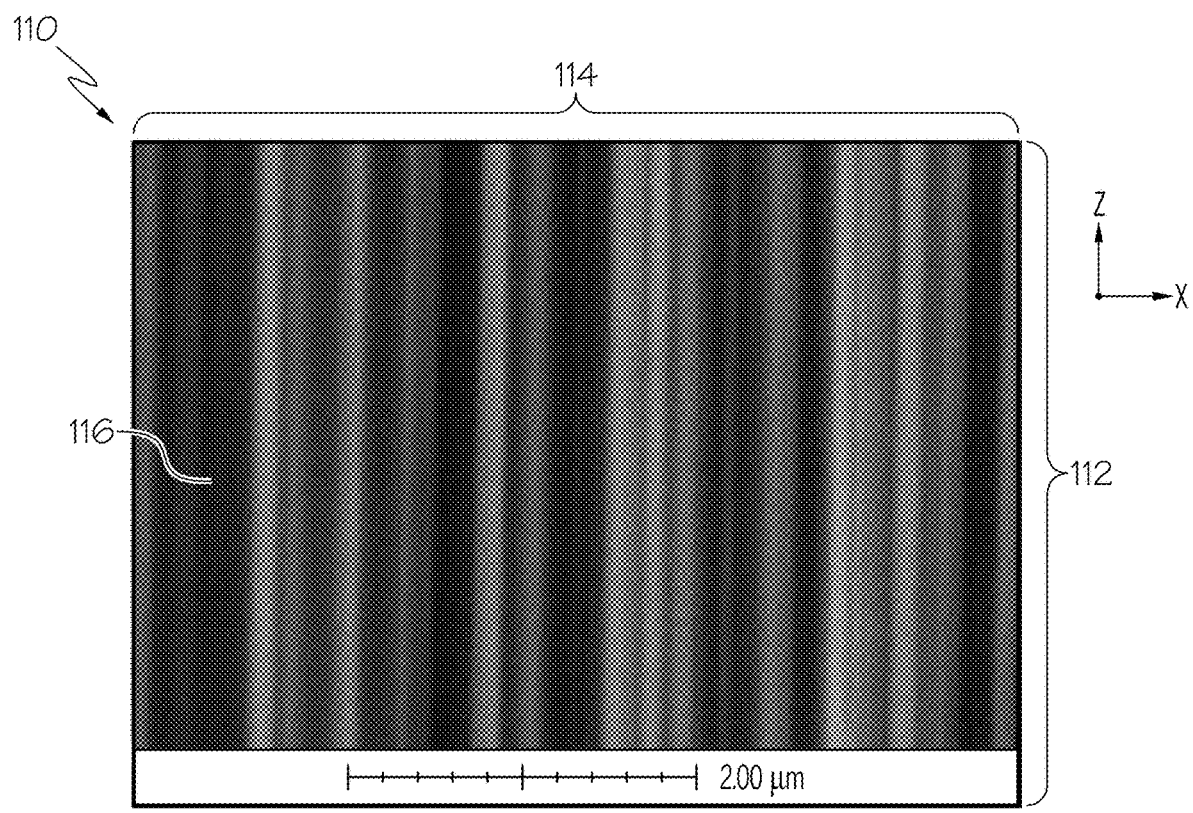
FIG. 3 is an SEM image of the optical transforming article of FIG. 2 along an x-z plane.
Figure 4:
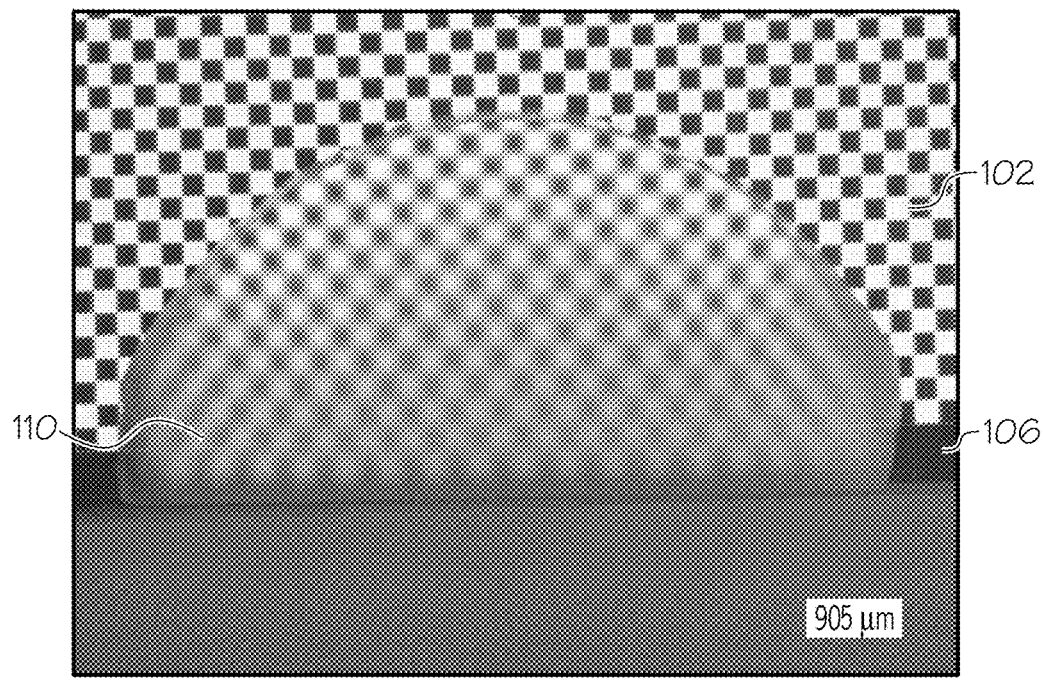
FIG. 4 is a photograph of the optical transforming effect of an optical transforming article according to one or more embodiments described herein.

Disclosed herein are optical transforming articles which mitigate the aforementioned problems. Specifically, referring now to FIGS. 2 and 3, the optical transforming articles 110 disclosed herein may generally be described as including an optical transforming layer 112 and a guide region 114 positioned inside the optical transforming layer 112. The guide region 114 includes a phase-separated glass 116 with materials arranged to form a quasi-random structure. The quasi-random structure of the phase-separated glass 116 has the degree of disorder required to produce Anderson localization (i.e., the absence of diffusion of waves in a disordered medium). By modifying the arrangement of the materials within the phase-separated glass 116, light may be directed in manner such that the viewing angle of the display area 102 is expanded and the bezel 106 is hidden as shown in FIG. 4. Unlike the periodic structure of conventional optical fibers that cover the entire display area 102, the quasi-random structure of the phase-separated glass 116 may be implemented to cover the entire display area 102 or an edge portion thereof across different electronic devices. Moreover, the quasi-random structure of the phase-separated glass 116 allows for the ability to customize and specifically tailor the optical transforming article 110 to the desired application.

Figure 5:
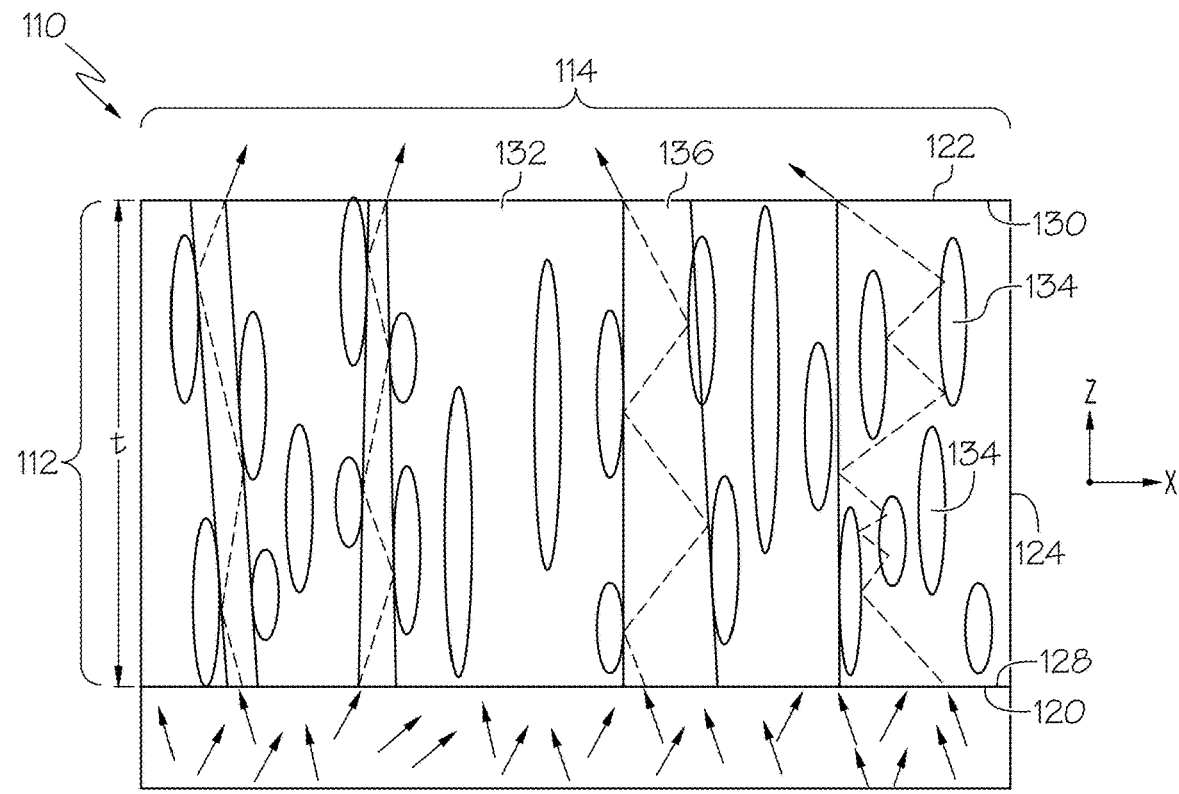
FIG. 5 is a schematic side view of an optical transforming article according to one or more embodiments described herein along an x-z plane.

Referring now to FIG. 5, the optical transforming layer 112 has a first surface 120 and a second surface 122 opposite the first surface 120. The first surface 120 and the second surface 122 are bound by a perimeter 124 of the optical transforming layer 112.

The guide region 114 is positioned inside and adjacent to at least a portion of the perimeter 124 of the optical transforming layer 112. The guide region 114 extends at least partially between the first surface 120 and the second surface 122. The guide region 114 includes an inlet end 128 positioned adjacent to the first surface 120 and an outlet end 130 positioned adjacent to the second surface 122.

The phase-separated glass 116 of the guide region 114 described herein comprises a continuous network phase 132 and a discontinuous phase 134. The discontinuous phase 134 is arranged within the continuous network phase 132 and comprises elongated (i.e., relatively high aspect ratio (length:width)) shaped regions aligned along a common axis (shown as the z-axis for illustrative purposes). In embodiments, the elongated shaped regions have an aspect ratio greater than or equal to 10:1, greater than or equal to 25:1, greater than or equal to 50:1, greater than or equal to 75:1, or even greater than or equal to 100:1. In embodiments, the elongated shaped regions of the discontinuous phase 46 have various lengths.

The discontinuous phase 134 has a different index of refraction than the continuous network phase 132 due to the differing compositions of the two phases. In embodiments, the relative difference in index of refraction between the continuous network phase 132 and discontinuous phase 134 is greater than or equal to 0.3%, greater than or equal to 1%, greater than or equal to 5%, or even greater than or equal to 10%. In view of the different indicies of refraction, the guide region 114 propagates light from the inlet end 128 to the outlet end 130 such that the light (shown as arrows and dotted lines for illustrative purposes) is directed from the first surface 120 to the second surface 122. In embodiments, the guide region 114 includes optical pathways 136 (shown as solid lines for illustrative purposes) that extend through the guide region 114 and have a light-guide effect (i.e., propagate light).

In embodiments, the index of refraction of the discontinuous phase 134 may be lower than the index of refraction of the continuous network phase 132 such that light is propagated within the continuous network phase 132 from the inlet end 128 to the outlet end 130 as shown in FIG. 5.

Figure 6:
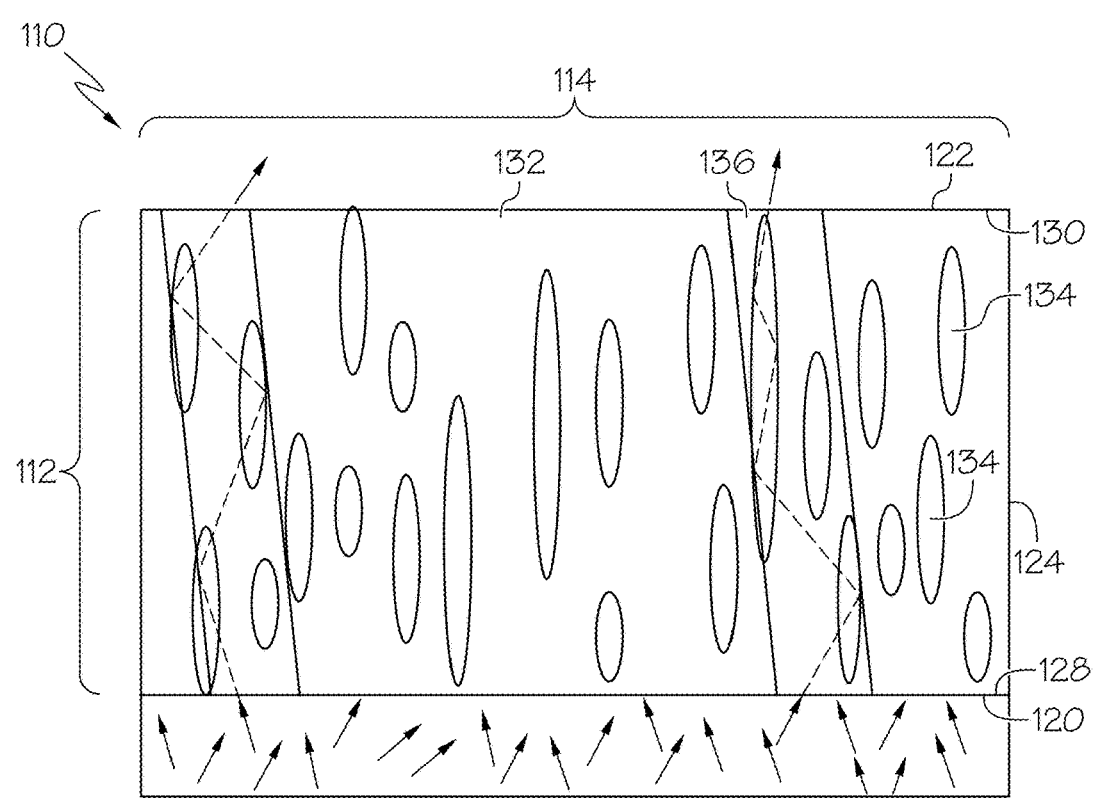
FIG. 6 is a schematic side view of an optical transforming article according to one or more embodiments described herein along an x-z plane.

Referring now to FIG. 6, the index of refraction of the discontinuous phase 134 may be greater than the index of refraction of the continuous network phase 132 such that light is propagated within the discontinuous phase 134 from the inlet end 128 to the outlet end 130.

Figure 7:
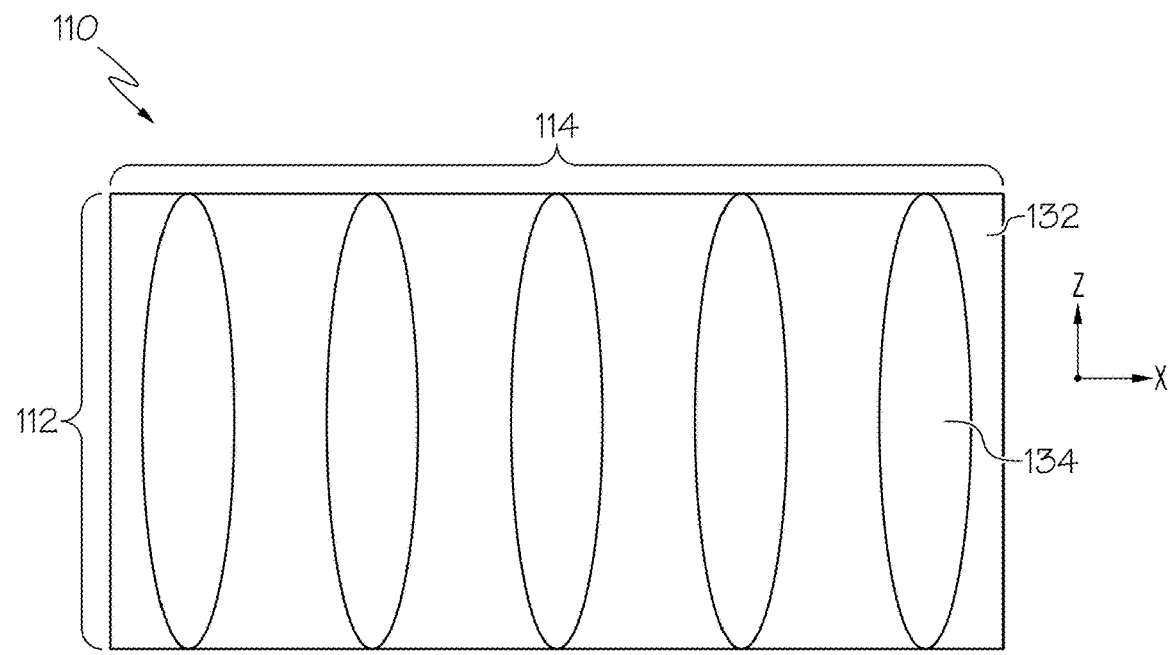
FIG. 7 is a schematic side view of an optical transforming article according to one or more embodiments described herein along an x-z plane.

Referring now to FIG. 7, in embodiments, the optical transforming article 110 has a structure that is quasi-random in the x-y plane and is generally invariant in the z-direction In embodiments, the continuous network phase 132 includes a glass-based material. In embodiments, the glass-based material may be described as a silicate, borosilicate, or aluminoborosilicate glass-based material.

$SiO_2$ is the primary glass former in the glass-based material described herein. In embodiments, the concentration of $SiO_2$ in the glass-based material may be greater than or equal to 50 mol %, greater than or equal to 55 mol %, greater than or equal to 60 mol %, greater than or equal to 65 mol %, or even greater than or equal to 70 mol %. In embodiments, the concentration of $SiO_2$ in the glass-based material may be less than or equal to 80 mol %, less than or equal to 75 mol %, or even less than or equal to 70 mol %. In embodiments, the concentration of $SiO_2$ in the glass-based material may be greater than or equal to 50 mol % and less than or equal to 80 mol %, greater than or equal to 50 mol % and less than or equal to 75 mol %, greater than or equal to 50 mol % and less than or equal to 70 mol %, greater than or equal to 55 mol % and less than or equal to 80 mol %, greater than or equal to 55 mol % and less than or equal to 75 mol %, greater than or equal to 55 mol % and less than or equal to 70 mol %, greater than or equal to 60 mol % and less than or equal to 80 mol %, greater than or equal to 60 mol % and less than or equal to 75 mol %, greater than or equal to 60 mol % and less than or equal to 70 mol %, greater than or equal to 65 mol % and less than or equal to 80 mol %, greater than or equal to 65 mol % and less than or equal to 75 mol %, greater than or equal to 65 mol % and less than or equal to 70 mol %, greater than or equal to 70 mol % and less than or equal to 80 mol %, or even greater than or equal to 70 mol % and less than or equal to 75 mol %, or any and all sub-ranges formed from any of these endpoints.

In addition to $SiO_2$, $B_2O_3$ is a glass former which may be added to the glass-based material to reduce the viscosity of the glass at a given temperature thereby enabling broader formability of the glass. In embodiments, the concentration of $B_2O_3$ in the glass-based material may be greater than or equal to 0 mol %, greater than or equal to 3 mol %, greater than or equal to 5 mol %, greater than or equal to 7 mol %, greater than or equal to 10 mol %, or even greater than or equal to 12 mol %. In embodiments, the concentration of $B_2O_3$ in the glass-based material may be less than or equal to 20 mol %, less than or equal to 17 mol %, less than or equal to 15 mol %, or even less than or equal to 13 mol %.

In embodiments, the concentration of $B_2O_3$ in the glass-based material may be greater than or equal to 0 mol % and less than or equal to 20 mol %, greater than or equal to 0 mol % and less than or equal to 17 mol %, greater than or equal to 0 mol % and less than or equal to 15 mol %, greater than or equal to 0 mol % and less than or equal to 13 mol %, greater than or equal to 3 mol % and less than or equal to 20 mol %, greater than or equal to 3 mol % and less than or equal to 17 mol %, greater than or equal to 3 mol % and less than or equal to 15 mol %, greater than or equal to 3 mol % and less than or equal to 13 mol %, greater than or equal to 5 mol % and less than or equal to 20 mol %, greater than or equal to 5 mol % and less than or equal to 17 mol %, greater than or equal to 5 mol % and less than or equal to 15 mol %, greater than or equal to 5 mol % and less than or equal to 13 mol %, greater than or equal to 7 mol % and less than or equal to 20 mol %, greater than or equal to 7 mol % and less than or equal to 17 mol %, greater than or equal to 7 mol % and less than or equal to 15 mol %, greater than or equal to 7 mol % and less than or equal to 13 mol %, greater than or equal to 10 mol % and less than or equal to 20 mol %, greater than or equal to 10 mol % and less than or equal to 17 mol %, greater than or equal to 10 mol % and less than or equal to 15 mol %, greater than or equal to 10 mol % and less than or equal to 13 mol %, greater than or equal to 12 mol % and less than or equal to 20 mol %, greater than or equal to 12 mol % and less than or equal to 17 mol %, greater than or equal to 12 mol % and less than or equal to 15 mol %, or even greater than or equal to 12 mol % and less than or equal to 13 mol %, or any and all sub-ranges formed from any of these endpoints.

In embodiments, the glass-based material described herein may include $Al_2O_3$. $Al_2O_3$ may stabilize the glass-based material and provide improved mechanical properties and chemical durability. The amount of $Al_2O_3$ may also be tailored to control the viscosity of the glass-based material. Accordingly, in embodiments, the amount of $Al_2O_3$ may be limited (e.g., less than or equal to 5 mol %) to ensure phase separation. In embodiments, the concentration of $Al_2O_3$ in the glass based-material may be greater than or equal to 0.5 mol % or even greater than or equal to 1 mol %. In embodiments, the concentration of $Al_2O_3$ in the glass based-material may be less than or equal to 5 mol %, less than or equal to 4 mol %, less than or equal to 3 mol %, less than or equal to 2 mol %, or even less than or equal to 1.5 mol %. In embodiments, the concentration of $Al_2O_3$ in the glass based-material may be greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 0.5 mol % and less than or equal to 2 mol %, greater than or equal to 0.5 mol % and less than or equal to 1.5 mol %, greater than or equal to 1 mol % and less than or equal to 5 mol %, greater than or equal to 1 mol % and less than or equal to 4 mol, greater than or equal to 1 mol % and less than or equal to 3 mol %, greater than or equal to 1 mol % and less than or equal to 2 mol %, or even greater than or equal to 1 mol % and less than or equal to 1.5 mol %, or any and all sub-ranges formed from any of these endpoints.

In embodiments, the glass-based material described herein may include one or more alkali oxides. The sum of all alkali oxides (in mol %) is expressed herein as $R_2O$. Specifically, $R_2O$ is the sum of $Na_2O$ (mol %), $K_2O$ (mol %), and $Li_2O$ (mol %) present in the glass-based material. Like $B_2O_3$, the alkali oxides aid in decreasing the softening point and forming temperature of the glass-based material, thereby offsetting the increase in the softening point and molding temperature of the glass composition due to higher amounts of $SiO_2$ in the glass-based material. In embodiments, the concentration of $R_2O$ in the glass-based material may be greater than or equal to 0 mol %, greater than or equal to 5 mol %, or even greater than or equal to 10 mol %. In embodiments, the concentration of $R_2O$ in the glass-based material may be less than or equal to 20 mol %, or even less than or equal to 15 mol %. In embodiments, the concentration of $R_2O$ in the glass-based material may be greater than or equal to 0 mol % and less than or equal to 20 mol %, greater than or equal to 0 mol % and less than or equal to 15 mol %, greater than or equal to 5 mol % and less than or equal to 20 mol %, greater than or equal to 5 mol % and less than or equal to 15 mol %, greater than or equal to 10 mol % and less than or equal to 20 mol %, or even greater than or equal to 10 mol % and less than or equal to 15 mol %, or any and all sub-ranges formed from any of these endpoints.

As noted herein, additions of alkali oxides such as $Na_2O$ decrease the softening point and molding temperature of the glass-based material, thereby offsetting the increase in the softening point and molding temperature of the glass-based material due to higher amounts of $SiO_2$ in the glass-based material. In embodiments, the concentration of $Na_2O$ in the glass-based material may be greater than or equal to 1 mol % or even greater than or equal to 2 mol %. In embodiments, the concentration of $Na_2O$ in the glass-based material may be less than or equal to 10 mol %, less than or equal to 7 mol %, less than or equal to 5 mol %, less than or equal to 4 mol %, or even less than or equal to 3 mol %. In embodiments, the concentration of $Na_2O$ in the glass-based material may be greater than or equal to 1 mol % and less than or equal to 10 mol %, greater than or equal to 1 mol % and less than or equal to 7 mol %, greater than or equal to 1 mol % and less than or equal to 5 mol %, greater than or equal to 1 mol % and less than or equal to 4 mol %, greater than or equal to 1 mol % and less than or equal to 3 mol %, greater than or equal to 2 mol % and less than or equal to 10 mol %, greater than or equal to 2 mol % and less than or equal to 7 mol %, greater than or equal to 2 mol % and less than or equal to 5 mol %, greater than or equal to 2 mol % and less than or equal to 4 mol %, or even greater than or equal to 2 mol % and less than or equal to 3 mol %, or any and all sub-ranges formed from any of these endpoints.

In embodiments, the concentration of $K_2O$ in the glass-based material may be greater than or equal to 0 mol %, greater than or equal to 1 mol % or even greater than or equal to 2 mol %. In embodiments, the concentration of $K_2O$ in the glass-based material may be less than or equal to 10 mol %, less than or equal to 7 mol %, less than or equal to 5 mol %, less than or equal to 4 mol %, or even less than or equal to 3 mol %. In embodiments, the concentration of $K_2O$ in the glass-based material may be greater than or equal to 0 mol % and less than or equal to 10 mol %, greater than or equal to 0 mol % and less than or equal to 7 mol %, greater than or equal to 0 mol % and less than or equal to 5 mol %, greater than or equal to 0 mol % and less than or equal to 4 mol %, greater than or equal to 0 mol % and less than or equal to 3 mol %, greater than or equal to 1 mol % and less than or equal to 10 mol %, greater than or equal to 1 mol % and less than or equal to 7 mol %, greater than or equal to 1 mol % and less than or equal to 5 mol %, greater than or equal to 1 mol % and less than or equal to 4 mol %, greater than or equal to 1 mol % and less than or equal to 3 mol %, greater than or equal to 2 mol % and less than or equal to 10 mol %, greater than or equal to 2 mol % and less than or equal to 7 mol %, greater than or equal to 2 mol % and less than or equal to 5 mol %, greater than or equal to 2 mol % and less than or equal to 4 mol %, or even greater than or equal to 2 mol % and less than or equal to 3 mol %, or any and all sub-ranges formed from any of these endpoints.

In embodiments, the concentration of $Li_2O$ in the glass-based material may be greater than or equal to 0 mol %, greater than or equal to 1 mol % or even greater than or equal to 2 mol %. In embodiments, the concentration of $Li_2O$ in the glass-based material may be less than or equal to 10 mol %, less than or equal to 7 mol %, less than or equal to 5 mol %, less than or equal to 4 mol %, or even less than or equal to 3 mol %. In embodiments, the concentration of $Li_2O$ in the glass-based material may be greater than or equal to 0 mol % and less than or equal to 10 mol %, greater than or equal to 0 mol % and less than or equal to 7 mol %, greater than or equal to 0 mol % and less than or equal to 5 mol %, greater than or equal to 0 mol % and less than or equal to 4 mol %, greater than or equal to 0 mol % and less than or equal to 3 mol %, greater than or equal to 1 mol % and less than or equal to 10 mol %, greater than or equal to 1 mol % and less than or equal to 7 mol %, greater than or equal to 1 mol % and less than or equal to 5 mol %, greater than or equal to 1 mol % and less than or equal to 4 mol %, greater than or equal to 1 mol % and less than or equal to 3 mol %, greater than or equal to 2 mol % and less than or equal to 10 mol %, greater than or equal to 2 mol % and less than or equal to 7 mol %, greater than or equal to 2 mol % and less than or equal to 5 mol %, greater than or equal to 2 mol % and less than or equal to 4 mol %, or even greater than or equal to 2 mol % and less than or equal to 3 mol %, or any and all sub-ranges formed from any of these endpoints.

In embodiments, the glass-based material may include at least one alkaline earth oxide. The sum of all alkaline earth oxides (in mol %) is expressed herein as RO. Specifically, RO is the sum of MgO (mol %), CaO (mol %), BaO (mol %), and SrO (mol %) present in the glass-based material. The alkaline earth oxides may be introduced in the glass-based material to enhance various properties. For example, the addition of certain alkaline earth oxides may aid in decreasing the softening point and molding temperature of the glass-based material, thereby offsetting the increase in the softening point and molding temperature of the glass-based material due to higher amounts of $SiO_2$ in the glass composition. The addition of certain alkaline earth oxides may increase the refractive index. In embodiments, the concentration of RO in the glass-based material may be greater than or equal to 5 mol %, greater than or equal to 10 mol %, or even greater than or equal to 15 mol %. In embodiments, the concentration of RO in the glass-based material may be less than or equal to 30 mol %, less than or equal to 25 mol %, or even less than or equal to 20 mol %. In embodiments, the concentration of RO in the glass-based material may be greater than or equal to 5 mol % and less than or equal to 30 mol %, greater than or equal to 5 mol % and less than or equal to 25 mol %, greater than or equal to 5 mol % and less than or equal to 20 mol %, greater than or equal to 10 mol % and less than or equal to 30 mol %, greater than or equal to 10 mol % and less than or equal to 25 mol %, greater than or equal to 10 mol % and less than or equal to 20 mol %, greater than or equal to 15 mol % and less than or equal to 30 mol %, greater than or equal to 15 mol % and less than or equal to 25 mol %, or even greater than or equal to 15 mol % and less than or equal to 20 mol %, or any and all sub-ranges formed from any of these endpoints.

In addition to improving the formability and the meltability of the glass-based material, small additions of BaO may also aid in reducing the liquidus temperature. BaO may also increase the refractive index of the network continuous phase and/or discontinuous phase of the resulting phase-separated glass, which may help to guide light around the bezel. In embodiments, the concentration of BaO in the glass-based material may be greater than or equal to 0 mol %, greater than or equal to 2 mol %, or even greater than or equal to 4 mol. In embodiments, the concentration of BaO in the glass-based material may be less than or equal to 30 mol %, less than or equal to 20 mol %, less than or equal to 10 mol %, or even less than or equal to 8 mol %. In embodiments, the concentration of BaO in the glass-based material may be greater than or equal to 0 mol % and less than or equal to 30 mol %, greater than or equal to 0 mol % and less than or equal to 20 mol %, greater than or equal to 0 mol % and less than or equal to 10 mol %, greater than or equal to 0 mol % and less than or equal to 8 mol %, greater than or equal to 2 mol % and less than or equal to 30 mol %, greater than or equal to 2 mol % and less than or equal to 20 mol %, greater than or equal to 2 mol % and less than or equal to 10 mol %, greater than or equal to 2 mol % and less than or equal to 8 mol %, greater than or equal to 4 mol % and less than or equal to 30 mol %, greater than or equal to 4 mol % and less than or equal to 20 mol %, greater than or equal to 4 mol % and less than or equal to 10 mol %, or even greater than or equal to 4 mol % and less than or equal to 8 mol %, or any and all sub-ranges formed from any of these endpoints.

In addition to improving the formability and the meltability of the glass-based material, CaO may also lower the liquidus temperature in small amounts while improving chemical durability. CaO may also increase the refractive index of the network continuous phase and/or discontinuous phase of the resulting phase-separated glass, which may help to guide light around the bezel. In embodiments, the concentration of CaO in the glass-based material may be greater than or equal to 0 mol %, greater than or equal to 2 mol %, or even greater than or equal to 4 mol %. In embodiments, the concentration of CaO in the glass-based material may be less than or equal to 30 mol %, less than or equal to 20 mol %, or less than or equal to 10 mol %, or even less than or equal to 8 mol %. In embodiments, the concentration of CaO in the glass-based material may be greater than or equal to 0 mol % and less than or equal to 30 mol %, greater than or equal to 0 mol % and less than or equal to 20 mol %, greater than or equal to 0 mol % and less than or equal to 10 mol %, greater than or equal to 0 mol % and less than or equal to 8 mol %, greater than or equal to 2 mol % and less than or equal to 30 mol %, greater than or equal to 2 mol % and less than or equal to 20 mol %, greater than or equal to 2 mol % and less than or equal to 10 mol %, greater than or equal to 2 mol % and less than or equal to 8 mol %, greater than or equal to 4 mol % and less than or equal to 30 mol %, greater than or equal to 4 mol % and less than or equal to 20 mol %, greater than or equal to 4 mol % and less than or equal to 10 mol %, or even greater than or equal to 4 mol % and less than or equal to 8 mol %, or any and all sub-ranges formed from any of these endpoints.

In embodiments, the concentration of MgO in the glass-based material may be greater than or equal to 0 mol %, greater than or equal to 2 mol %, or even greater than or equal to 4 mol %. In embodiments, the concentration of MgO in the glass-based material may be less than or equal to 30 mol %, less than or equal to 20 mol %, or less than or equal to 10 mol %, or even less than or equal to 8 mol %. In embodiments, the concentration of MgO in the glass-based material may be greater than or equal to 0 mol % and less than or equal to 30 mol %, greater than or equal to 0 mol % and less than or equal to 20 mol %, greater than or equal to 0 mol % and less than or equal to 10 mol %, greater than or equal to 0 mol % and less than or equal to 8 mol %, greater than or equal to 2 mol % and less than or equal to 30 mol %, greater than or equal to 2 mol % and less than or equal to 20 mol %, greater than or equal to 2 mol % and less than or equal to 10 mol %, greater than or equal to 2 mol % and less than or equal to 8 mol %, greater than or equal to 4 mol % and less than or equal to 30 mol %, greater than or equal to 4 mol % and less than or equal to 20 mol %, greater than or equal to 4 mol % and less than or equal to 10 mol %, or even greater than or equal to 4 mol % and less than or equal to 8 mol %, or any and all sub-ranges formed from any of these endpoints.

In embodiments, the concentration of SrO in the glass-based material may be greater than or equal to 0 mol %, greater than or equal to 2 mol %, or even greater than or equal to 4 mol %. In embodiments, the concentration of SrO in the glass-based material may be less than or equal to 30 mol %, less than or equal to 20 mol %, or less than or equal to 10 mol %, or even less than or equal to 8 mol %. In embodiments, the concentration of SrO in the glass-based material may be greater than or equal to 0 mol % and less than or equal to 30 mol %, greater than or equal to 0 mol % and less than or equal to 20 mol %, greater than or equal to 0 mol % and less than or equal to 10 mol %, greater than or equal to 0 mol % and less than or equal to 8 mol %, greater than or equal to 2 mol % and less than or equal to 30 mol %, greater than or equal to 2 mol % and less than or equal to 20 mol %, greater than or equal to 2 mol % and less than or equal to 10 mol %, greater than or equal to 2 mol % and less than or equal to 8 mol %, greater than or equal to 4 mol % and less than or equal to 30 mol %, greater than or equal to 4 mol % and less than or equal to 20 mol %, greater than or equal to 4 mol % and less than or equal to 10 mol %, or even greater than or equal to 4 mol % and less than or equal to 8 mol %, or any and all sub-ranges formed from any of these endpoints.

In embodiments, the glass-based material may include PbO. PbO may increase the refractive index of the continuous network phase and/or discontinuous phase of the resulting phase-separated glass, which may help to guide light around the bezel. In embodiments, the concentration of PbO in the glass based material may be greater than or equal to 0 mol %, greater than or 1 mol %, greater than or equal to 2 mol %, or even greater than or equal to 3 mol %. In embodiments, the concentration of PbO in the glass based material may be less than or equal to 10 mol %, less than or equal to 7 mol %, or even less than or equal to 5 mol %. In embodiments, the concentration of PbO in the glass based material may be greater than or equal to 0 mol % and less than or equal to 10 mol %, greater than or equal to 0 mol % and less than or equal to 7 mol %, greater than or equal to 0 mol % and less than or equal to 5 mol %, greater than or equal to 1 mol % and less than or equal to 10 mol %, greater than or equal to 1 mol % and less than or equal to 7 mol %, greater than or equal to 1 mol % and less than or equal to 5 mol %, greater than or equal to 2 mol % and less than or equal to 10 mol %, greater than or equal to 2 mol % and less than or equal to 7 mol %, greater than or equal to 2 mol % and less than or equal to 5 mol %, greater than or equal to 3 mol % and less than or equal to 10 mol %, greater than or equal to 3 mol % and less than or equal to 7 mol %, or even greater than or equal to 3 mol % and less than or equal to 5 mol %, or any and all sub-ranges formed from any of these endpoints.

In embodiments, the glass-based material may include $P_2O_5$. $P_2O_5$ decreases the softening point and molding temperature of the glass-based material, thereby offsetting the increase in the softening point and molding temperature of the glass-based material due to higher amounts of $SiO_2$ in the glass-based material. Also, $P_2O_5$ improves the glass formability. In embodiments, the concentration of $P_2O_5$ in the glass-based material may be greater than or equal to 0 mol %, greater than greater than or equal to 0.5 mol %, or even greater than or equal to 0.75 mol %. In embodiments, the concentration of $P_2O_5$ in the glass-based material may be less than or equal to 5 mol %, less than or equal to 4 mol %, less than or equal to 3 mol %, less than or equal to 2 mol %, less than or equal to 1.5 mol %, or even less than or equal to 1 mol %. In embodiments, the concentration of $P_2O_5$ in the glass-based material may be greater than or equal to 0 mol % and less than or equal to 5 mol %, greater than or equal to 0 mol % and less than or equal to 4 mol %, greater than or equal to 0 mol % and less than or equal to 3 mol %, greater than or equal to 0 mol % and less than or equal to 2 mol %, greater than or equal to 0 mol % and less than or equal to 1.5 mol %, greater than or equal to 0 mol % and less than or equal to 1 mol %, greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 0.5 mol % and less than or equal to 2 mol %, greater than or equal to 0.5 mol % and less than or equal to 1.5 mol %, greater than or equal to 0.5 mol % and less than or equal to 1 mol %, greater than or equal to 0.75 mol % and less than or equal to 5 mol %, greater than or equal to 0.75 mol % and less than or equal to 4 mol %, greater than or equal to 0.75 mol % and less than or equal to 3 mol %, greater than or equal to 0.75 mol % and less than or equal to 2 mol %, or even greater than or equal to 0.75 mol % and less than or equal to 1.5 mol %, or any and all sub-ranges formed from any of these endpoints.

In embodiments, the discontinuous phase 134 includes a glass-based material. In embodiments, a glass-based material is treated to induce separation into the continuous network phase 132 and the discontinuous phase 134 as described in U.S. Pat. No. 3,870,399, which is hereby incorporated by reference in its entirety.

Figure 8:
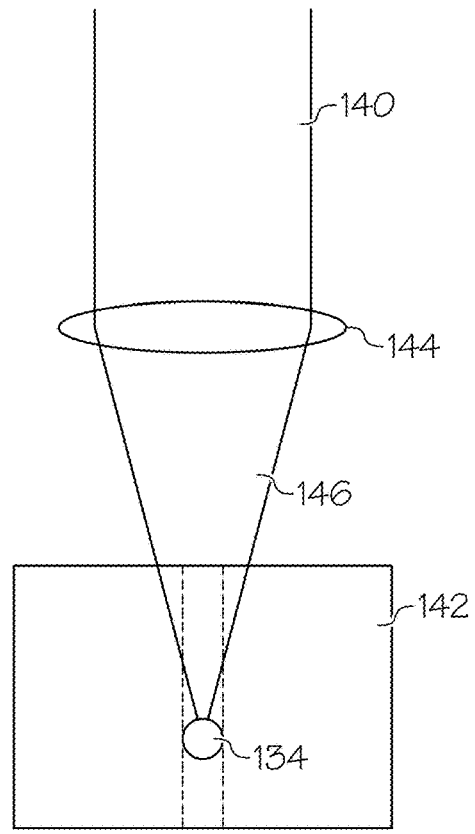
FIG. 8 is a schematic view of a laser that may be used to form an optical transforming article according to one or more embodiments described herein.
Figure 9:
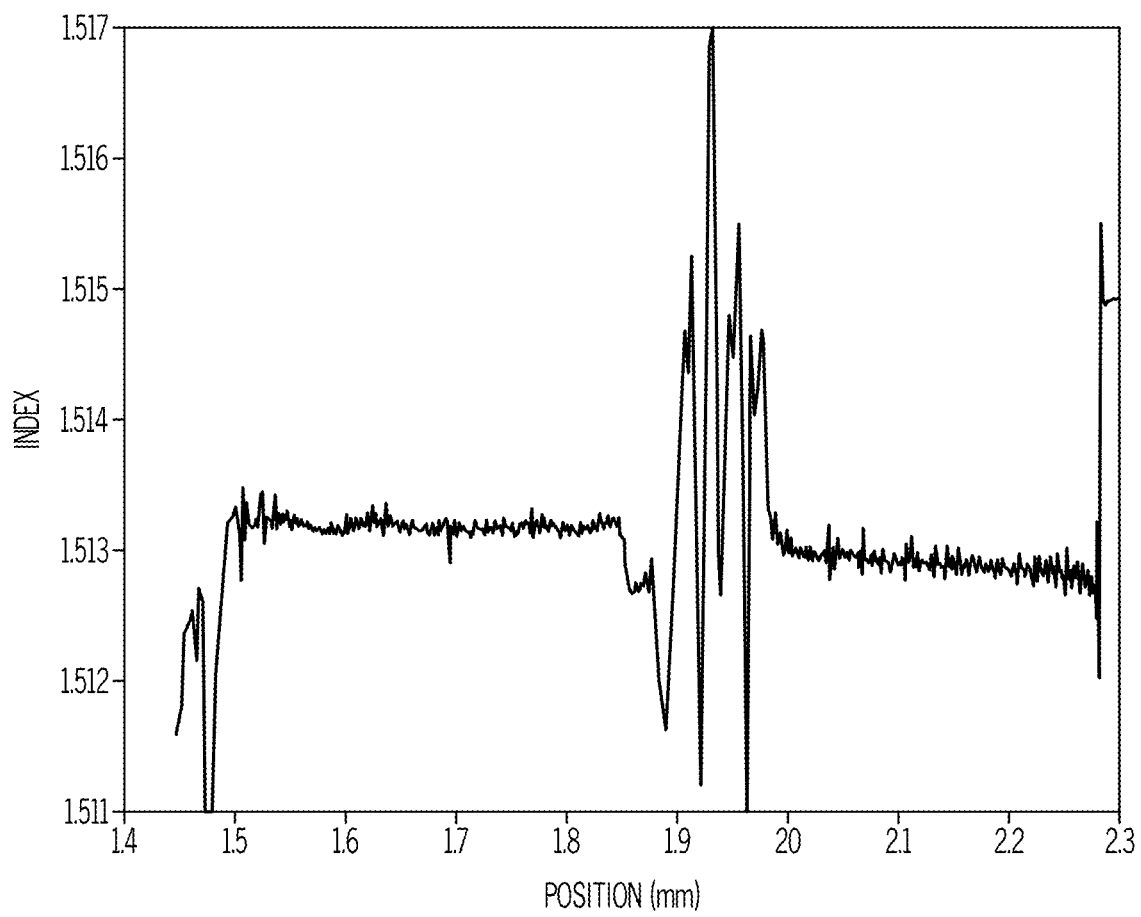
FIG. 9 is a plot of index of refraction (x-axis: Position; y-axis: Index of Refraction) an optical transforming article that may be formed using the laser of FIG. 8.

In embodiments, the discontinuous phase 134 includes a modified portion of the continuous network phase 132. For example, referring now to FIG. 8, an ultrashort pulsed laser 140 may be used to locally modify multiple points of a substrate (e.g., glass-based material) 142 and form the discontinuous phase 134, such as the discontinuous phase 134 shown in FIG. 7. The ultrashort pulsed laser 140 may be passed through a lens system 144 to generate a focused ultrashort pulsed laser beam 146. In embodiments, by adjusting the distance between the lens system 144 and the substrate 142, a discontinuous phase 134 having regions of different shapes and sizes and with and without taper regions may be formed, such as the discontinuous phase 134 shown in FIGS. 20, 21, and 24-26. Different shaped and sized discontinuous phase 134 regions may also be formed by focusing or defocusing the ultrashort pulsed laser beam 146 and changing the spot size of the ultrashort pulsed laser beam 146. In embodiments, the ultrashort pulsed laser beam 146 has a wavelength in a range from 200 nm to 10000 nm, a pulse shape in a range from 1 fs to 10000 fs, and an average spot diameter in a range from 1 μm to 1000 μm. As shown in FIG. 9, locally modifying the glass-based material 142 alters the index of refraction at various points along the glass-based material 142.

Figure 10:
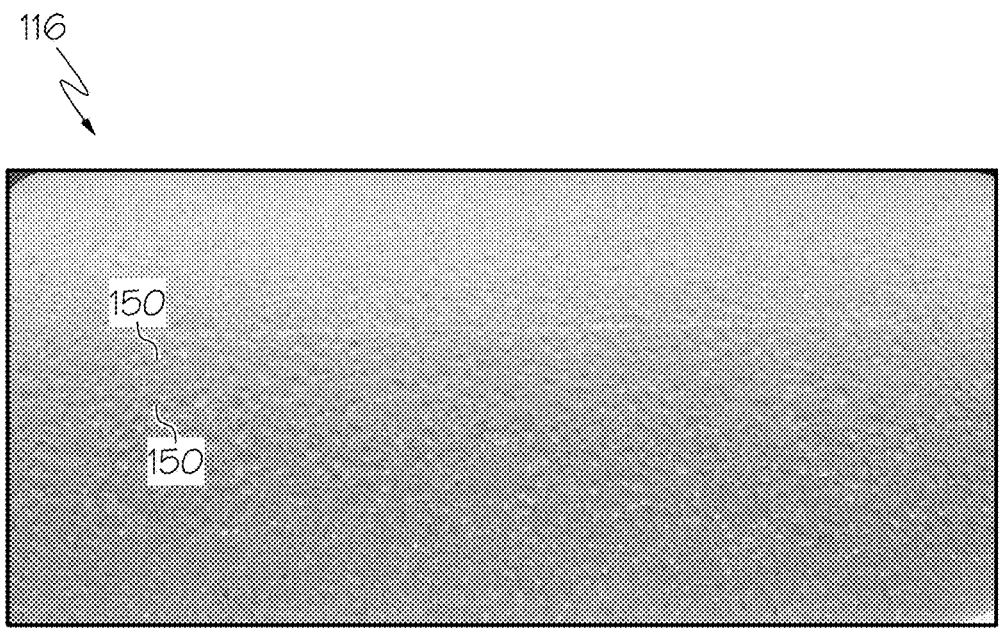
FIG. 10 is a photograph of an optical transforming article according to one or more embodiments described herein.
Figure 11:
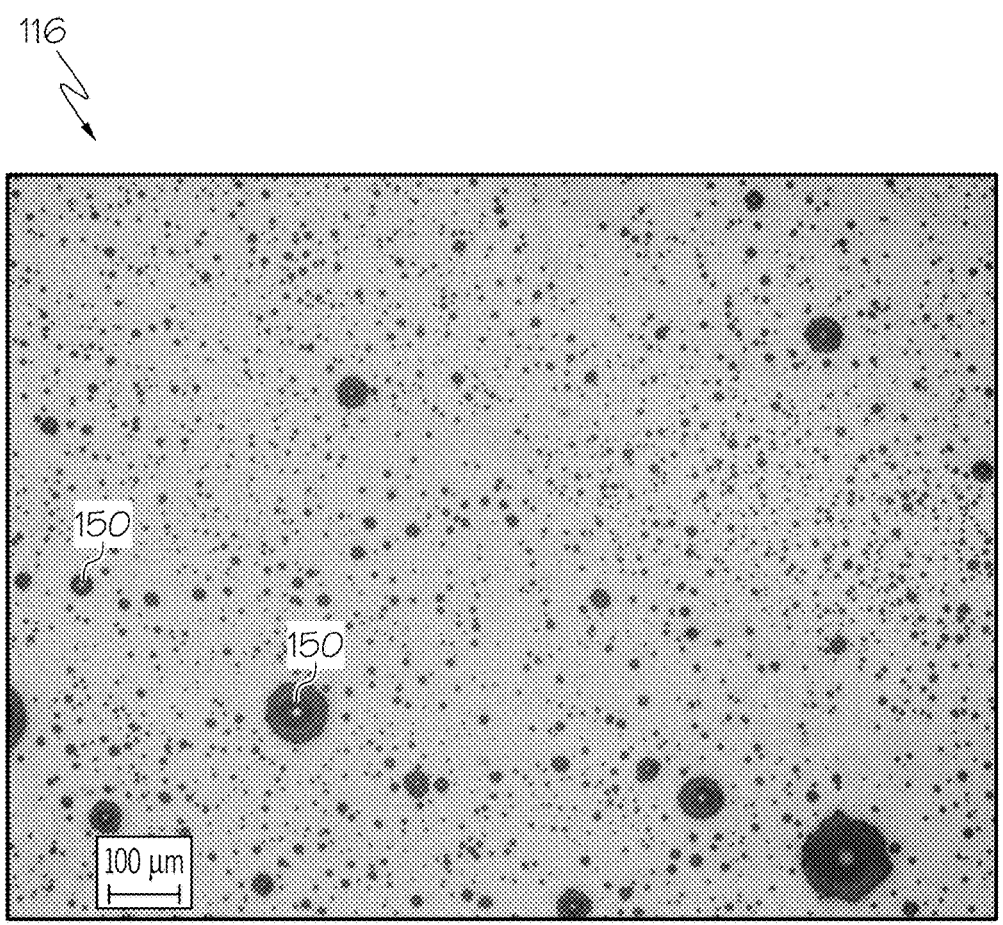
FIG. 11 is a photograph of an optical transforming article according to one or more embodiments described herein.

In embodiments, the discontinuous phase comprises air. For example, referring to FIG. 10, a phase-separated glass 116 filled with air 150 bubbles. Referring now to FIG. 11, a phase-separated glass 116 comprising air 150 as the discontinuous phase may be formed by pressing and sintering glass powders to create a glass/air puck.

In embodiments, after forming the discontinuous phase 134, the optical transforming article 110 may be elongated along the common axis with which the elongated shaped regions of the discontinuous phase 134 are aligned to further extend the elongated shapes at least partially between the first surface 120 to the second surface 122. In addition to have different indicies of refraction, the continuous network phase 132 and the discontinuous phase 134 may have different viscosities, which enables the elongation of the discontinuous phase 134 within the continuous network phase 132. Any process known in the art may be used to elongate the optical transforming article 110, such as down-draw, redraw, extrusion, and up-draw.

Figure 12:
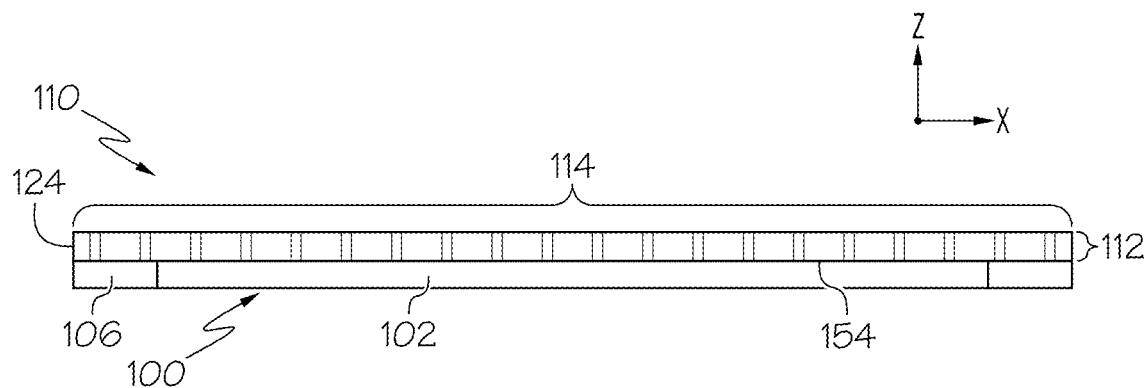
FIG. 12 is a schematic side view of an optical transforming article according to one or more embodiments described herein arranged adjacent to an outer surface of a display area of a display device along an x-z plane.
Figure 13:
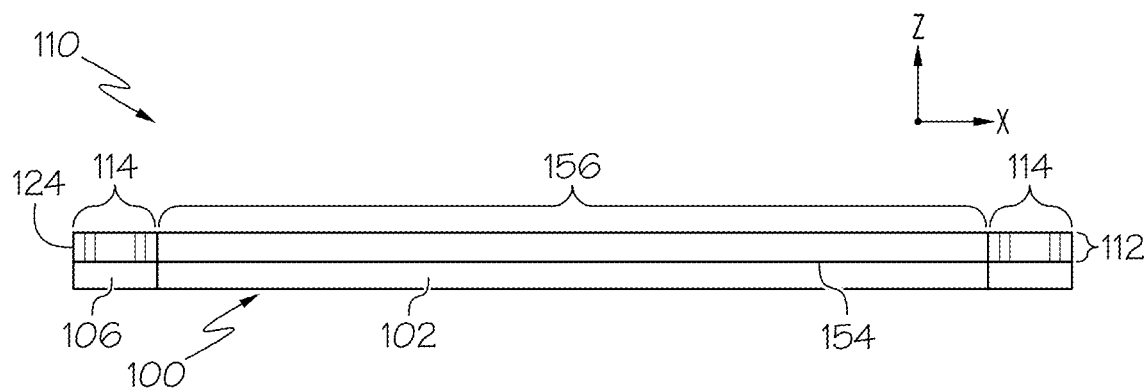
FIG. 13 is a schematic side view of an optical transforming article according to one or more embodiments described herein arranged adjacent to an outer surface of a display area of a display device along an x-z plane.

Referring now to FIGS. 12 and 13, the optical transforming articles 110 are arranged adjacent to an outer surface 154 of the display area 102 of the display device 100. In embodiments, the optical transforming layer 112 is entirely composed of the guide region 114 (i.e., extends across entire display area 102 and bezel 106 as shown in FIG. 12). In embodiments, the optical transforming article 110 includes a substrate or a guide-free region 156 as shown in FIG. 13. The guide-free region 156 is distinct from the guide region 114. In embodiments, the optical transforming layer 112 is positioned adjacent to and bounded by the guide region 114.

Figure 14:
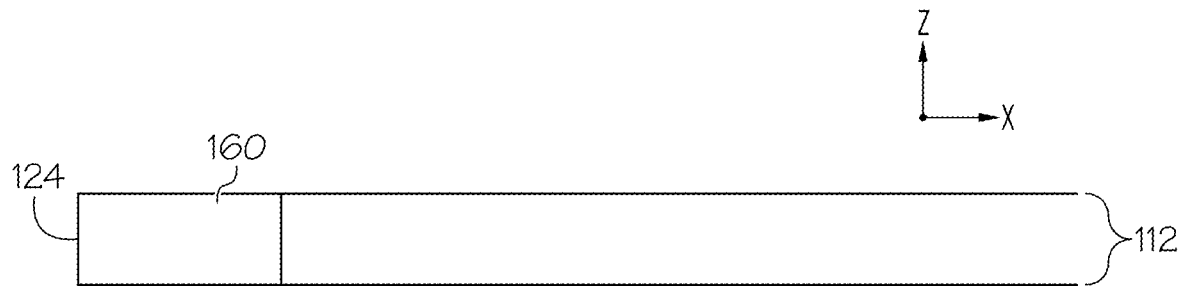
FIG. 14 is a schematic side view of an optical transforming article according to one or more embodiments described herein along an x-z plane.
Figure 15:
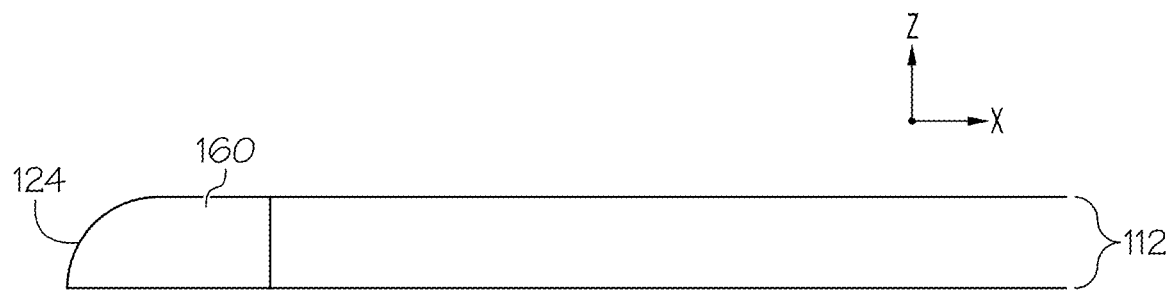
FIG. 15 is a schematic side view of an optical transforming article according to one or more embodiments described herein along an x-z plane.
Figure 16:
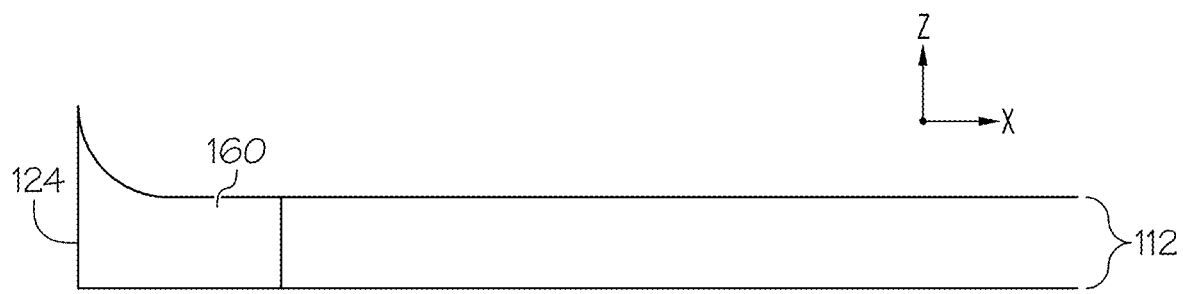
FIG. 16 is a schematic side view of an optical transforming article according to one or more embodiments described herein along an x-z plane.

Referring now to FIG. 14, in embodiments, the optical transforming layer 112 is planar, including at an edge portion 160 of the optical transforming layer 112. Referring now to FIG. 15, in embodiments, an edge portion 160 of the optical transforming layer 112 comprises a concave portion adjacent to the perimeter 124. Referring now to FIG. 16, in embodiments, an edge portion 160 of the optical transforming layer 112 comprises a convex portion adjacent to the perimeter 124. The shape of the edge portion 160 may be selected to aid in guiding light around the bezel 106 based on the intended application of the optical transforming layer 112.

Figure 17:
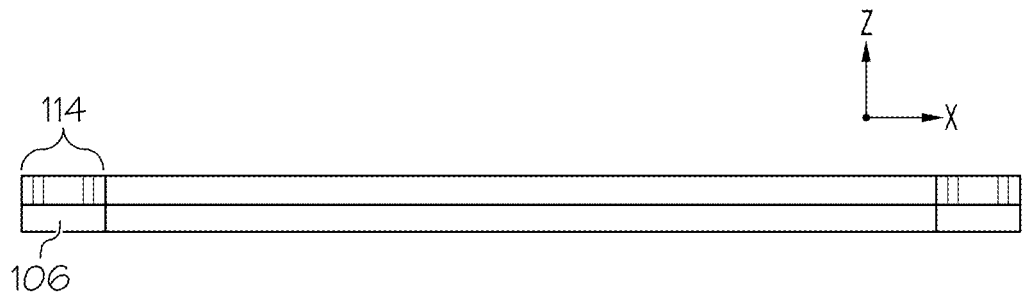
FIG. 17 is a schematic side view of an optical transforming article according to one or more embodiments described herein arranged adjacent to an outer surface of a display area of a display device along an x-z plane.
Figure 18:
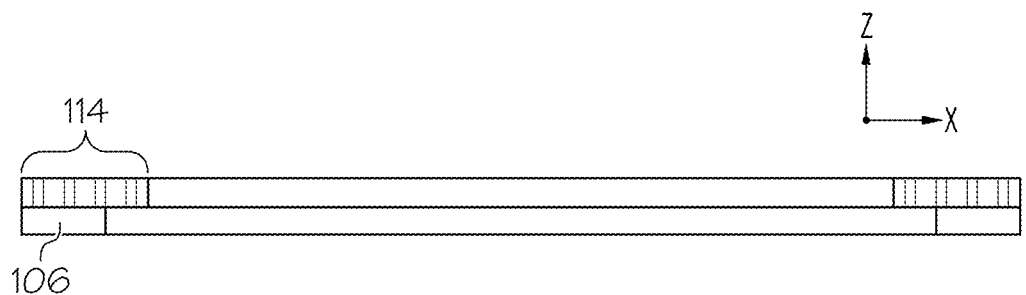
FIG. 18 is a schematic side view of an optical transforming article according to one or more embodiments described herein arranged adjacent to an outer surface of a display area of a display device along an x-z plane.
Figure 19:
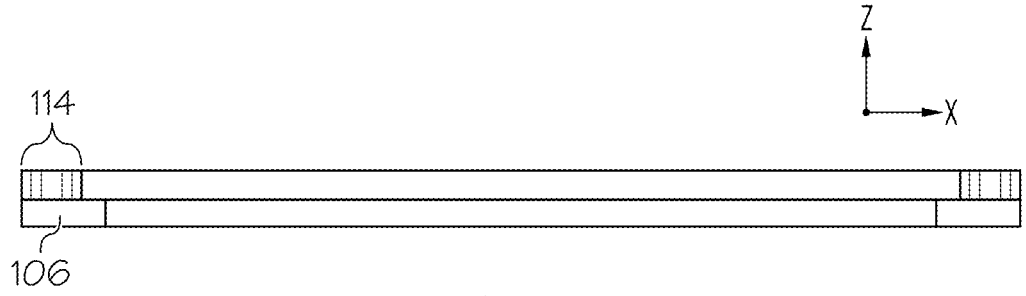
FIG. 19 is a schematic side view of an optical transforming article according to one or more embodiments described herein arranged adjacent to an outer surface of a display area of a display device along an x-z plane.

Referring now to FIG. 17, in embodiments, an area of the guide region 114 is equal to an area of the bezel 106. Referring now to FIG. 18, in embodiments, an area of the guide region 114 is greater than an area of the bezel 106. Referring now to FIG. 19, in embodiments, an area of the guide region 114 is less than an area of the bezel 106. As illustrated in FIGS. 5 and 6, light enters, is directed through, and exits the optical transforming article 110 at various angles. Accordingly, it may be advantageous to adjust the size of the guide region depending on the specific application.

Figure 20:
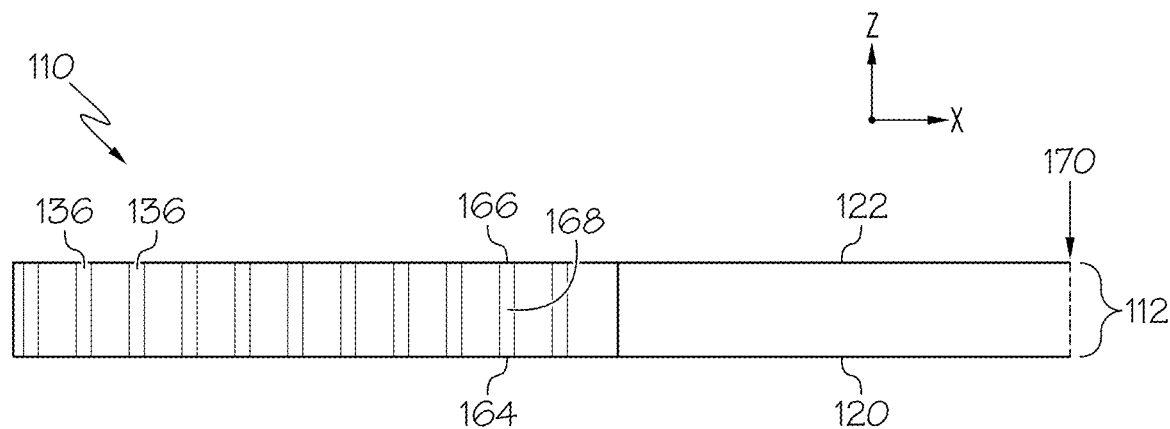
FIG. 20 is a schematic side view of an optical transforming article according to one or more embodiments described herein along an x-z plane.

In embodiments, the arrangement of the continuous network phase 132 and discontinuous phase 134 may be altered or modified to form a plurality of optical pathways have a desired shape and function. Referring to FIG. 20, the plurality of optical pathways 136 include an inlet end 164 and an outlet end 166. In embodiments, the inlet end 164 is positioned adjacent to the first surface 120 of the optical transforming layer 112 and the outlet end 166 is positioned adjacent to a second surface 122 of the optical transforming layer 112. In embodiments, the plurality of optical pathways 136 may comprise a straight pathway 168. The inlet end 164 and the outlet end 166 of the straight pathway 168 are offset from a center 170 of the optical transforming layer 112 by a same distance.

Figure 21:
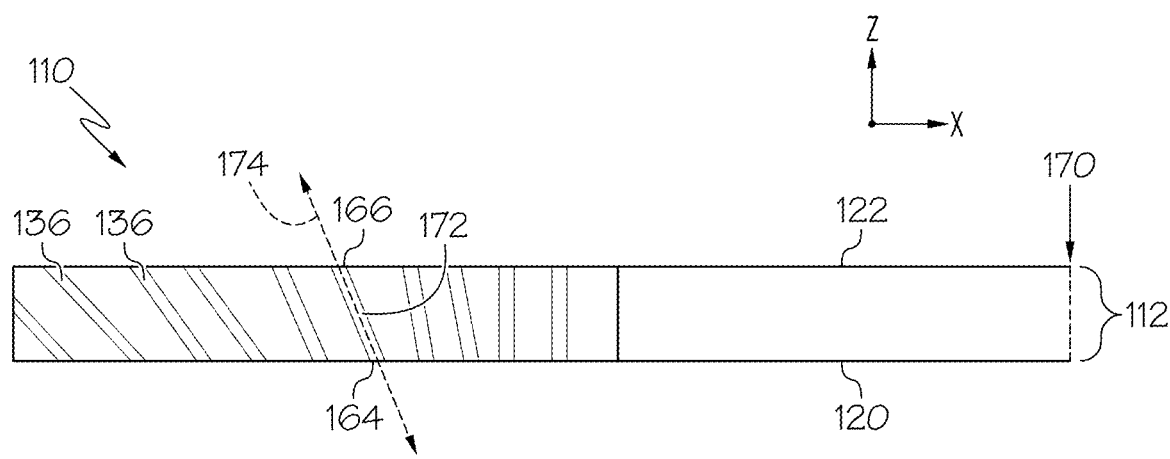
FIG. 21 is a schematic side view of an optical transforming article according to one or more embodiments described herein along an x-z plane.

Referring now to FIG. 21, in embodiments, the plurality of optical pathways 136 may comprise a shaped pathway 172. The inlet end 164 of the shaped pathway 172 is closer to a center 170 of the optical transforming layer 112 than the outlet end 166 of the shaped pathway 172. In embodiments, a central optical axis 174 of the shaped pathway 172 is generally linear (i.e., extends along a straight or nearly straight line) from the inlet end 164 to the outlet end 166.

Figure 22:
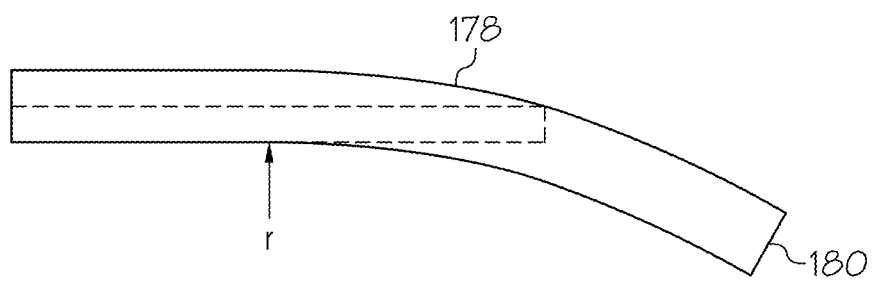
FIG. 22 is a schematic side view of an optical article that may be used to form an optical transforming article according to one or more embodiments described herein.
Figure 23:
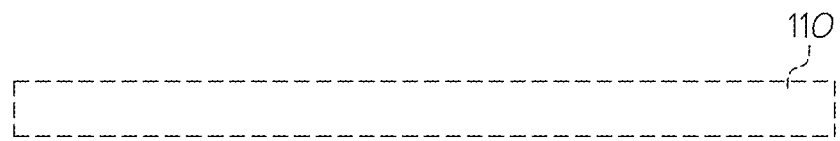
FIG. 23 is a schematic cross-sectional view of the cropped optical article of FIG. 22.

Referring now to FIG. 22, in embodiments, to form an optical transforming article 110 (e.g., including the plurality of optical pathways 136 comprising a shaped pathway 172 as shown in FIG. 21), an optical article 178 is provided. In embodiments, the optical article 178 is an optical transforming article 110 as described herein, such as the optical transforming article 110 shown in FIG. 20. The optical article 178 is bent at a radius of curvature r such that a portion of the guide region 114 located near the perimeter 180 is shaped. The optical article 178 is cropped along a point of the bent optical article 178. The cropped optical article 178 is polished to obtain the optical transforming article 110 having a generally uniform thickness as shown in FIG. 23.

In embodiments, the radius of curvature r at which the optical article 178 is bent may be greater than or equal to 50 μm and less than or equal to 5000 μm, greater than or equal to 100 μm and less than or equal to 2500 μm, or even greater than or equal to 250 μm and less than or equal to 1000 μm, or any and all sub-ranges formed from any of these endpoints.

In embodiments, the bending step may include bending the optical article 178 at a point positioned greater than or equal to 0.1 mm and less than or equal to 10 mm, greater than or equal to 0.5 mm and less than or equal to 7 mm, or even greater than or equal to 1 mm and less than or equal to 10 mm, or any and all sub-ranges formed from any of these endpoints, from the perimeter 180 of the optical article 178.

In embodiments, the optical article 178 may have a thickness greater than or equal to 0.1 mm and less than or equal to 5 mm, greater than or equal to 0.5 mm and less than or equal to 5 mm, or even greater than or equal to 1 mm and less than or equal to 5 mm, or any and all sub-ranges formed from any of these endpoints.

In embodiments, prior to the bending step, the optical article 178 may be heated at a temperature greater than or equal to 600° C. and less than or equal to 900° C., greater than or equal to 650° C. and less than or equal to 850° C., or even greater than or equal to 700° C. and less than or equal to 800° C., or any and all sub-ranges formed from any of these endpoints. In embodiments, prior to the bending step, the optical article may be heated for a time greater than or equal to 5 minutes and less than or equal to 210 minutes, greater than or equal to 100 minutes and less than or equal to 180 minutes, or even greater than or equal to 60 minutes and less than or equal to 120 minutes, or any and all sub-ranges formed from any of these endpoints.

Figure 24:
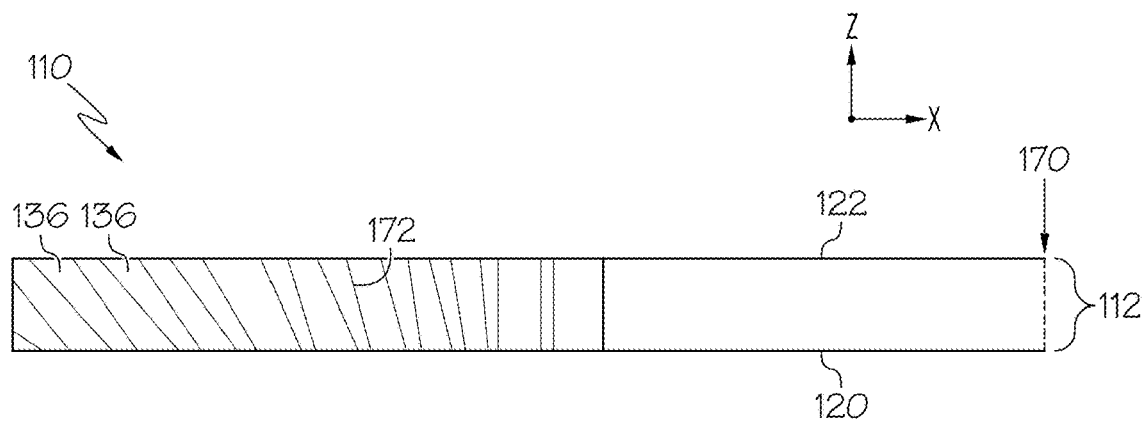
FIG. 24 is a schematic side view of an optical transforming article according to one or more embodiments described herein along an x-z plane.

Referring now to FIG. 24, in embodiments, the shaped pathway 172 tapers (i.e., reduces in width (shown along the x-axis for illustrative purposes)) from the second surface 122 to the first surface 120. In embodiments, to form the plurality of optical pathways 136 comprising the tapered shaped pathway 172, a rod may be used. The rod, which includes phase-separated glass 116 (FIGS. 5 and 6), may be elongated and cut to create the optical transforming article 110 shown in FIG. 24. In embodiments, the rod is a tapered rod. In embodiments, the rod may have a diameter from 1 cm to 10 cm, from 2 cm to 7 cm, or even from 3 cm to 5 cm.

Figure 25:
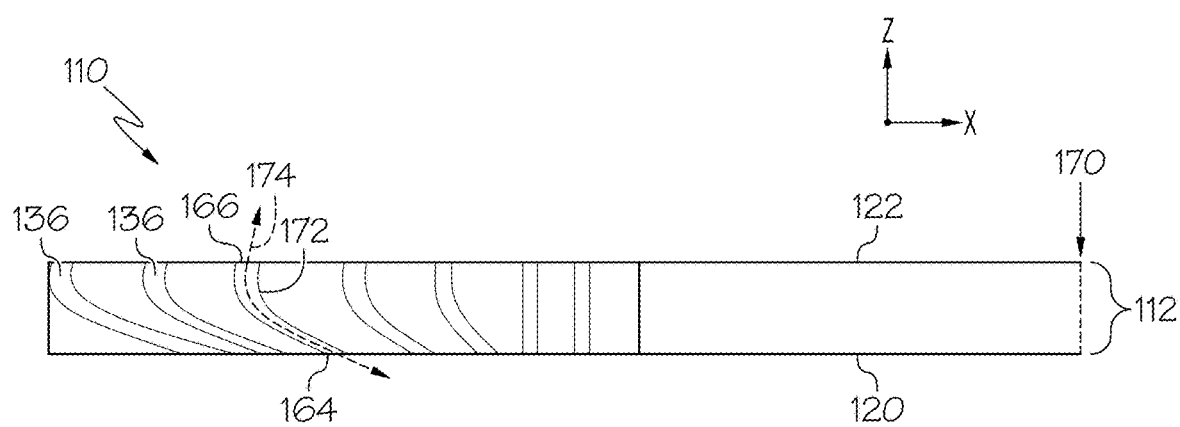
FIG. 25 is a schematic side view of an optical transforming article according to one or more embodiments described herein along an x-z plane.
Figure 26:
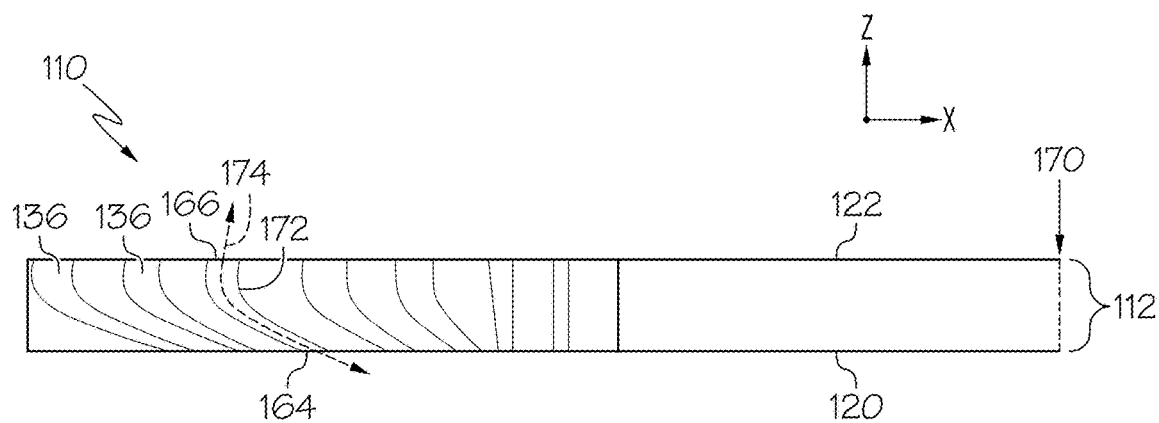
FIG. 26 is a schematic side view of an optical transforming article according to one or more embodiments described herein along an x-z plane.

Referring now to FIGS. 25 and 26, in embodiments, a central optical axis 174 of the shaped pathway 172 may comprises a radius of curvature from the inlet end 164 to the outlet end 166. In embodiments, to form the plurality of optical pathways 136 including the curved shaped pathway 172, an optical article having a shaped pathway 172 having an inlet end 164 that is closer to a center 170 of the optical transforming layer 112 than the outlet end 166 is provided. In embodiments, the optical article including a shaped pathway 172 is bent, cropped, and polished to form the curved shaped pathway 172. In embodiments, the optical transforming article 110 of FIG. 21 is rebent, recropped, and repolished such that one of the plurality of shaped pathways 172 becomes curved.

As shown in FIGS. 21, and 24-26, in embodiments, the plurality of optical pathways 136 may comprise both a plurality of straight pathways 168 and a plurality of shaped pathways 172. In embodiments, the plurality of straight pathways 168 may be positioned between the center 170 of the optical transforming layer 112 and the plurality of shaped pathways 172.

In embodiments, a central optical axis 174 of one of the plurality of shaped pathways 172 has a greater radius of curvature (i.e., is curved more) than a central optical axis 174 of another of the plurality of shaped pathways 172 that is positioned closer to the center 170 of the optical transforming layer 112. In embodiments, one of the plurality of shaped pathways 172 has a greater difference between a distance from the inlet end 164 to the center 170 of the optical transforming layer 112 and a distance from the outlet end 166 to the center 170 of the optical transforming layer 112 (i.e., is tilted more) than another of the plurality of shaped pathways 172 that is positioned closer to the center 170 of the optical transforming layer 112.

Figure 27:
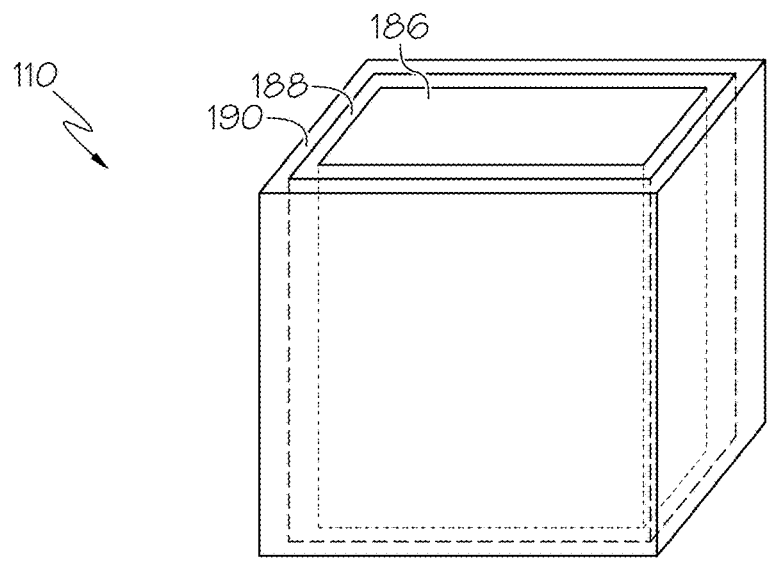
FIG. 27 is a schematic perspective view of a substrate that may be used to form an optical transforming article in accordance with one or more embodiments described herein.
Figure 28:
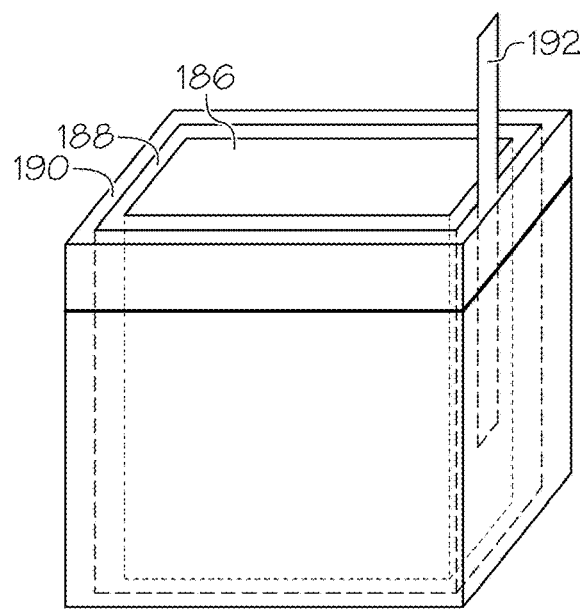
FIG. 28 is a schematic perspective view of the substrate of FIG. 27 showing a groove of the substrate being filled with a guide material.
Figure 29:
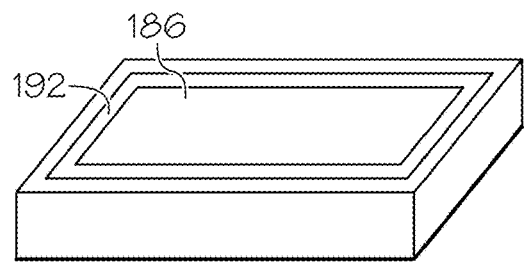
FIG. 29 is a schematic perspective view of the substrate of FIG. 27 showing the groove of the substrate filled with the guide material.
Figure 30:
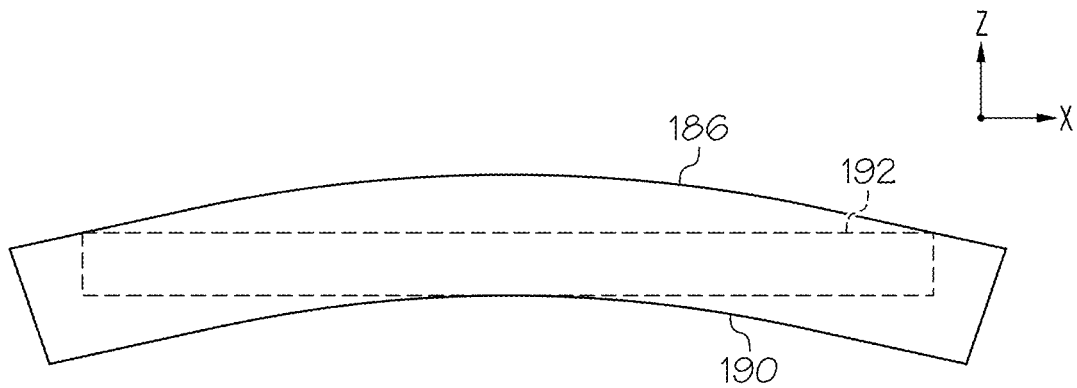
FIG. 30 is a schematic perspective view of the substrate of FIG. 29 being bent.
Figure 31:
FIG. 31 is a schematic side view of an optical transforming article with a tapered guide region in accordance with one or more embodiments described herein along an x-z plane.
Figure 32:
FIG. 32 is a schematic side view of an optical transforming article with a tapered guide region in accordance with one or more embodiments described herein along an x-z plane.

Referring now to FIG. 27, a method of forming a tapered guide region 184 includes providing a substrate 186. In embodiments, the substrate 186 may be formed of a glass-based material in accordance with one or more embodiments described herein. A groove 188 is formed at an edge portion 190 of the substrate 186. Referring now to FIGS. 28 and 29, the groove 188 is filled with a guide material 192 having a greater index of refraction than that of the substrate 186. In embodiments, the guide material 192 may be formed of a glass-based material, such as a phase-separated glass, in accordance with one or more embodiments described herein. Referring now to FIG. 30, the edge portion 190 of the substrate 186 including the guide material 192 is bent at a radius of curvature causing the edge portion 190 of the substrate 186 and the guide material 192 located therein to become curved. Referring now to FIGS. 31 and 32, the substrate 186 is cropped along a point of the curved edge of the substrate 186. The substrate 186 is polished to form the article 194 having generally uniform thickness and the tapered guide region 184.

In embodiments, the radius of curvature at which the substrate 186 is bent may be greater than or equal to 50 μm and less than or equal to 5000 μm, greater than or equal to 100 μm and less than or equal to 2500 μm, or even greater than or equal to 250 μm and less than or equal to 1000 μm, or any and all sub-ranges formed from any of these endpoints.

An article 110 comprising: an optical transforming layer 112 having a first surface 120 and a second surface 122 opposite the first surface 120, the first surface 120 and second surface 122 bound by a perimeter 124 of the optical transforming layer 112; and a guide region 114 positioned inside and adjacent to at least a portion of the perimeter 124 of the optical transforming layer 112, wherein the guide region 114 extends at least partially between the first surface 120 to the second surface 122, wherein the guide region 114 comprises an inlet end 128 positioned adjacent to the first surface 120 and an outlet end 130 positioned adjacent the second surface 122, wherein the guide region 114 propagates light from the inlet end 128 to the outlet end 130 such that the light is directed from the first surface 120 to the second surface 122, the guide region 114 comprising: a phase-separated glass 116 comprising a continuous network phase 132 and a discontinuous phase 134, wherein a relative difference in index of refraction between the continuous network phase 132 and the discontinuous phase 134 is greater than or equal to 0.3%, wherein the discontinuous phase 134 comprises elongated shaped regions aligned along a common axis and having an aspect ratio greater than or equal to 100:1.

A method of forming an optical transforming article 110, the method comprising: providing an optical article 178 comprising: a first surface 120; a second surface 122 opposite the first surface 120, the first surface 120 and second surface 122 bound by a perimeter 124 of the optical article 178; a guide region 114 positioned adjacent to at least a portion of the perimeter 124 of the optical article 178, wherein the guide region 114 extends at least partially between the first surface 120 to the second surface 122, wherein the guide region 114 comprises an inlet end 128 positioned adjacent to the first surface 120 and an outlet end 130 positioned adjacent the second surface 122, wherein the guide region 114 propagates light from the inlet end 128 to the outlet end 130 such that the light is directed from the first surface 120 to the second surface 122, the guide region 114 comprising: a phase-separated glass 116 comprising a continuous network phase 132 and a discontinuous phase 134, wherein a relative difference in index of refraction between the continuous network phase 132 and the discontinuous phase 134 is greater than or equal to 0.3%, wherein the discontinuous phase 134 comprises elongated shaped regions aligned along a common axis and having an aspect ratio greater than or equal to 100:1; and bending the optical article 178 adjacent to the perimeter 180 at a radius of curvature in the range of from 50 µm to 5000 µm such that a portion of the guide region 114 located near the perimeter 180 is shaped, the inlet end 128 of the shaped portion of the guide region 114 being closer to a center 170 of the optical transforming layer 112 than the outlet end 130 of the shaped portion of the guide region 114; cropping the optical article 178 along a point of the bended optical article 178; and polishing the optical article 178 to obtain the optical transforming article 110 having a generally uniform thickness.

A method of forming a tapered guide region 184 in an article 194, the method comprising: providing a substrate 186; forming a groove 188 at an edge portion 190 of the substrate 186; filling the groove 188 with a guide material 192, the guide material 192 having an index of refraction greater than that of the substrate 186; bending the edge portion 190 of the substrate 186 at a radius of curvature in the range of 50 µm to 5000 µm such that the edge portion 190 of the substrate 186 and the guide material 192 located therein become curved; cropping the substrate 186 along a point of the curved edge of the substrate 186; and polishing the substrate 186 to form the article 194 having generally uniform thickness and the tapered guide region 184.

A method of forming a guide region 114 in an article, the method comprising: providing a substrate 142; and directing an ultrashort pulsed laser 140 at the substrate 142 to simultaneously modify multiple points of the material and generate the guide region 114, wherein an ultrashort pulsed laser beam 146 of the ultrashort pulsed laser 140 has a wavelength in a range from 200 nm to 10000 nm, a pulse shape in a range from 1 fs to 10000 fs, and an average spot diameter in a range from 1 µm to 1000 µm.

EXAMPLES

In order that various embodiments be more readily understood, reference is made to the following examples, which are intended to illustrate various embodiments of the optical transforming layer described herein.

Table 1 shows an example glass composition (in terms of mol %).

TABLE 1

| Example | 1 |
|---|---|
| $SiO_2$ | 70.5 |
| $B_2O_3$ | 13 |
| $Al_2O_3$ | 1.5 |
| $Na_2O$ | 3 |
| $P_2O_5$ | 1 |
| CaO | 5 |
| BaO | 6 |

Example 1—Glass Cullet

A batch was prepared for the composition shown in Table 1 by mixing the components, loading the mixture into a crucible, and melting the mixture at 1500° C. for 8 hours. The melted glass was poured out of the crucible to produce glass cullet (i.e., broken pieces of glass). The delivered glass was allowed to cool to room temperature (i.e., quench) without any annealing of the glass. The glass cullet had a white, opaque color, which indicated that the glass phase separated into a discontinuous phase within a surrounding continuous network phase.

In particular, Table 2 shows the compositional makeup (in terms of mol %) of the resulting glass cullet. The continuous network phase of the glass cullet was silica rich and boron poor and the discontinuous phase was boron rich and silica poor, and included relatively more barium. Because of the difference in composition between the continuous network phase and discontinuous phase, the two phases had different properties, including index of refraction. A phase that is silica rich and barium poor will have a lower refractive index than a phase that is boron rich and include relatively more barium. Therefore, light traveling through the glass cullet described in this example would travel within the discontinuous phase.

TABLE 2

|  | Continuous network phase | Discontinuous phase |
|---|---|---|
| $SiO_2$ | 81.81 | 38.55 |
| $B_2O_3$ | 10.53 | 20.33 |
| $Al_2O_3$ | 1.37 | 1.91 |
| $Na_2O$ | 2.19 | 2.11 |
| $P_2O_5$ | 0.36 | 17.74 |
| CaO | 1.77 | 14.03 |
| BaO | 1.98 | 5.34 |

Figure 33:
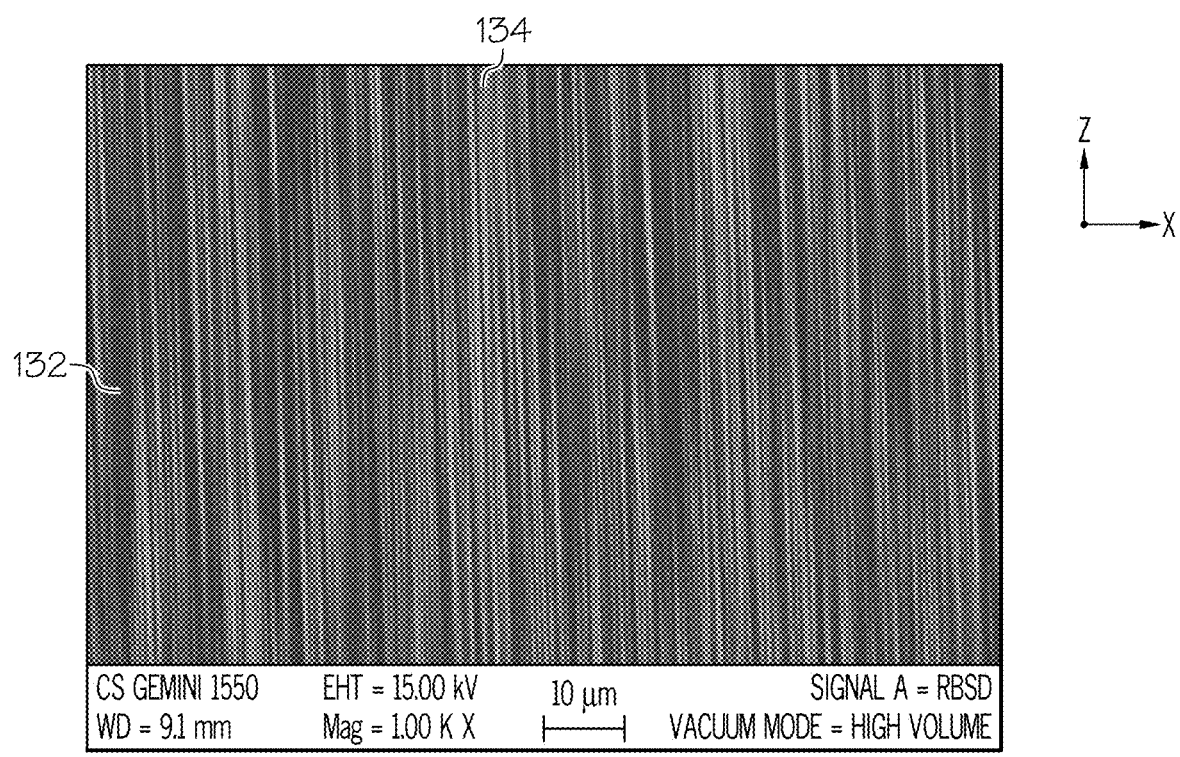
FIG. 33 is an SEM image of the optical transforming article along an x-z plane according to one or more embodiments described herein.

The glass cullet was remelted and down drawn into a rod. Specifically, approximately 15 kg of glass cullet was loaded into a melting vessel that had a 110 mm circular opening at its bottom. This opening was plugged off. The vessel and cullet were heated at 1550° C. for 12 hours to allow fining (i.e., removing bubbles) of the glass. The temperature was lowered to approximately 1080° C. and the plug was removed from the bottom opening. As the glass exited the bottom opening, it created a root where the glass was being attenuated down in size forming a rod having a diameter of approximately 15 mm. Referring now to FIG. 33, the formation of the rod resulted in a continuous network phase 132 and a discontinuous phase 134 having elongated shaped regions. In addition to the difference in refractive index, the two phases had a difference in viscosity. The continuous network phase 132 had a viscosity of approximately 90,000 P and the discontinuous phase had a viscosity of approximately 800 P, which allowed for the formation of the elongated shaped regions of the discontinuous phase 134 within the continuous network phase 132.

To achieve an optical transforming layer, the rod was sliced into thinner sections perpendicular to the long axis of the rod. The flat rod slices were placed into a fixture that had a base and a top section, each with a machined curvature. The base of the fixture had a concave contour and the top of the fixture had a convex contour of the desired radius of curvature. A 4 kg static weight was applied to the fixture with the flat rod slices and the fixture was placed in a furnace at 735° C. for 0.5 hour. The curved rod slices were removed from the fixture and allowed to cool to room temperature to form optical transforming layers.

Example 2—Casting Technique

As a variation to the glass delivery mentioned above, the melted molten glass having the composition shown in Table 1 was formed into rod by using a casting technique. A graphite cylindrical bar mold was used, and the molten glass was delivered into the mold via crucible pour. A rod was formed by backfilling a round mold combined with an inner plunger that was slowly lowered down through the mold. The mold was then placed into an annealer at 575° C. for 8 hours to eliminate any internal stress from cooling of the glass. The formed rod had a white, opaque color, which indicated that the glass phase separated into a discontinuous phase within a surrounding network continuous phase.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An article comprising:
    an optical transforming layer having a first surface and a second surface opposite the first surface, the first surface and the second surface bound by a perimeter of the optical transforming layer; and
    a guide region positioned inside and adjacent to at least a portion of the perimeter of the optical transforming layer, wherein the guide region extends at least partially between the first surface to the second surface, wherein the guide region comprises an inlet end positioned adjacent to the first surface and an outlet end positioned adjacent the second surface, wherein the guide region propagates light from the inlet end to the outlet end such that the light is directed from the first surface to the second surface, the guide region comprising:
        a phase-separated glass comprising a quasi-random structure of a continuous network phase and a discontinuous phase, wherein a relative difference in index of refraction between the continuous network phase and the discontinuous phase is greater than or equal to 0.3%, wherein the discontinuous phase comprises elongated shaped regions aligned along a common axis and having an aspect ratio greater than or equal to 10:1.

2. The article of claim 1, wherein the index of refraction of the discontinuous phase is greater than the index of refraction of the continuous network phase such that light is propagated within the discontinuous phase from the inlet end to the outlet end.

3. The article of claim 1, wherein the index of refraction of the discontinuous phase is lower than index of refraction of the continuous network phase such that light is propagated within the continuous network phase from the inlet end to the outlet end.

4. The article of claim 1, wherein the discontinuous phase comprises a glass-based material.

5. The article of claim 4, wherein the discontinuous phase comprises a modified portion of the continuous network phase.

6. The article of claim 1, wherein the discontinuous phase comprises air.

7. The article of claim 1, wherein the optical transforming layer is entirely comprised of the guide region.

8. The article of claim 1, wherein the article further includes a guide-free region, wherein the guide-free region is distinct from the guide region.

9. The article of claim 8, wherein the optical transforming layer is disposed adjacent to and bounded by the guide region.

10. The article of claim 9, wherein the guide region comprises a plurality of optical pathways that extend through the guide region, wherein each optical pathway has an inlet end and an outlet end.

11. The article of claim 10, wherein the plurality of optical pathways comprises a straight pathway, wherein the inlet end and the outlet end of the straight pathway are offset from a center of the optical transforming layer by a same distance.

12. The article of claim 10, wherein the plurality of optical pathways comprises a shaped pathway, wherein the inlet end of the shaped pathway is closer to a center of the optical transforming layer than the outlet end of the shaped pathway.

13. The article of claim 12, wherein a central optical axis of the shaped pathway is generally linear from the inlet end to the outlet end.

14. The article of claim 13, wherein the shaped pathway tapers from the second surface to the first surface.

15. The article of claim 12, wherein a central optical axis of the shaped pathway comprises a radius of curvature from the inlet end to the outlet end.

16. The article of claim 10, wherein the plurality of optical pathways comprises:
    a plurality of straight pathways, the inlet end and the outlet end of each of the straight pathways being offset from a center of the optical transforming layer by a same distance; and
    a plurality of shaped pathways, the inlet end of each of the shaped pathways being closer to the center of the optical transforming layer than the outlet end of each of the shaped pathways, wherein the plurality of straight pathways are positioned between the center of the optical transforming layer and the plurality of shaped pathways.

17. The article of claim 1, wherein the article is the optical transforming layer.

18. The article of claim 1, wherein the article is a display device, the display device comprising:
 a display area; and
 a bezel extending around the display area,
 wherein the optical transforming layer is arranged adjacent to an outer surface of the display area.

19. A method of forming an optical transforming article, the method comprising:
 providing an optical article comprising:
  a first surface;
  a second surface opposite the first surface, the first surface and second surface bound by a perimeter of the optical article;
  a guide region positioned adjacent to at least a portion of the perimeter of the optical article, wherein the guide region extends at least partially between the first surface to the second surface, wherein the guide region comprises an inlet end position adjacent to the first surface and an outlet end position adjacent the second surface, wherein the guide region propagates light from the inlet end to the outlet end such that the light is directed from the first surface to the second surface, the guide region comprising:
   a phase-separated glass comprising a continuous network phase and a discontinuous phase, wherein a relative difference in index of refraction between the continuous network phase and the discontinuous phase is greater than or equal to 0.3%, wherein the discontinuous phase comprises elongated shaped regions aligned along a common axis and having an aspect ratio greater than or equal to 100:1; and
 bending the optical article adjacent to the perimeter at a radius of curvature in the range from 50 μm to 5000 μm such that a portion of the guide region located near the perimeter is shaped, the inlet end of the shaped portion of the guide region being closer to a center of the optical transforming layer than the outlet end of the shaped portion of the guide region;
 cropping the optical article along a point of the bended optical article; and
 polishing the optical article to obtain the optical transforming article having a generally uniform thickness.

20. The method of claim 19, wherein after the polishing step, the bending, cropping, and polishing steps are repeated such that the shaped portion of the guide region becomes curved.

* * * * *